(12) United States Patent
Ubuki et al.

(10) Patent No.: US 7,054,655 B2
(45) Date of Patent: May 30, 2006

(54) BASE STATION DEVICE, CONTROL STATION DEVICE, AND TRANSMISSION POWER CONTROL METHOD

(75) Inventors: Hiromitsu Ubuki, Yokosuka (JP); Toyoki Ue, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 676 days.

(21) Appl. No.: 10/111,633

(22) PCT Filed: Aug. 28, 2001

(86) PCT No.: PCT/JP01/07345

§ 371 (c)(1),
(2), (4) Date: Apr. 26, 2002

(87) PCT Pub. No.: WO02/19568

PCT Pub. Date: Mar. 7, 2002

(65) Prior Publication Data

US 2003/0119541 A1 Jun. 26, 2003

(30) Foreign Application Priority Data

Aug. 29, 2000 (JP) .............................. 2000-259510

(51) Int. Cl.
*H04B 7/00* (2006.01)
(52) U.S. Cl. .................. 455/522; 455/69; 455/561
(58) Field of Classification Search ........... 455/522, 455/69, 561, 70, 452.2, 450; 370/318, 328
See application file for complete search history.

(56) References Cited

U.S. PATENT DOCUMENTS 6,414,946 B1 * 7/2002 Satou et al. ............... 370/328
6,542,756 B1 * 4/2003 Kim ........................... 455/522
6,650,876 B1 * 11/2003 Ostman et al. ............. 455/103
6,687,510 B1 * 2/2004 Esteves et al. .............. 455/522

(Continued)

FOREIGN PATENT DOCUMENTS

JP     1 0051379       2/1998

(Continued)

OTHER PUBLICATIONS

International Search Report dated Nov. 27, 2001.

(Continued)

*Primary Examiner*—Nick Corsaro
*Assistant Examiner*—Tan Trinh
(74) *Attorney, Agent, or Firm*—Stevens, Davis, Miller & Mosher, LLP

(57) ABSTRACT

A total-transmission-power measurement section 113 measures a total-transmission-power-value output from a transmitting RF circuit 112, and outputs the measured value to a total-transmission-power comparison section 152. A reference-total-transmission-power setting section 151 outputs a reference total-transmission-power-value, which is a target of the total-transmission-power-value of a base station, to the total-transmission-power comparison section 152. The total-transmission-power comparison section 152 outputs instructions to reduce allowable transmission-power-values to allowable-transmission-power setting sections 153 of users 1–n, when a value obtained by subtracting of the reference total-transmission-power-value, which has been input from the reference-total-transmission-power setting section 151, from the total-transmission-power-value input from the total-transmission-power measurement section 113 exceeds a predetermined value. The allowable-transmission-power setting sections 153 decide appropriate allowable transmission-power-values, based on the instructions input from the total-transmission-power comparison section 152, and output the decided value to individual-transmission-power comparison sections 106.

13 Claims, 15 Drawing Sheets

U.S. PATENT DOCUMENTS

| | | | |
|---|---|---|---|
| 6,754,505 B1* | 6/2004 | Baker et al. | 455/522 |
| 2002/0089947 A1* | 7/2002 | Holtzman et al. | 370/328 |
| 2003/0003875 A1* | 1/2003 | Oestreich | 455/69 |
| 2003/0087661 A1* | 5/2003 | Qin et al. | 455/522 |
| 2004/0087327 A1* | 5/2004 | Guo | 455/522 |

FOREIGN PATENT DOCUMENTS

| | | |
|---|---|---|
| JP | 11074834 | 3/1999 |
| JP | 2000091985 | 3/2000 |
| JP | 2000217144 | 8/2000 |
| JP | 2000217159 | 8/2000 |
| JP | 2001036463 | 2/2001 |

OTHER PUBLICATIONS

Fumio Kikuchi, et al., "Performance of SIR-Based Transmit Power Control using Outer Loop in the Forward Link of DS-CDMA," NTT Mobile Communications Network Inc., Technical Report of IEICE, pp. 113-118 (Feb. 1997).

* cited by examiner

BASE STATION DEVICE, CONTROL STATION DEVICE, AND TRANSMISSION POWER CONTROL METHOD

TECHNICAL FIELD

The present invention relates to a base station apparatus, a control station apparatus, and a method for controlling transmission power, and, more particularly, relates to a base station apparatus, a control station apparatus, and a method for controlling transmission power, which are used in a digital radio communication system.

BACKGROUND ART

In CDMA communication, there is a so-called distance problem that a signal transmitted by a communication terminal at a short distance becomes strong interference with signals transmitted by other communication terminals, as a plurality of communication terminals use the same radio frequency band. There is transmission-power-control in order to solve the distance problem. In the transmission-power-control, a base station apparatus makes instructions so that received levels of signals transmitted from each communication terminal become a predetermined level.

And, in the transmission-power-control of downlink signals transmitted from the base station apparatus to communication terminals, the communication terminals measure received SIRs of pilot symbols, and send transmission-power-control instructions to the base station apparatus based on the measured results. As the base station apparatus controls the transmission power based on the above transmission-power-control instructions, and transmits signals, the communication terminals may receive signals with a desired received level.

A conventional radio communication apparatus will be described, using a document, "Study on a transmission-power-control method using following-up control of fluctuations in instantaneous values in DS-CDMA downlink channels" (The Institute of Electronics, Information and Communication Engineers, Technical Report AP96-148, EMCJ96-83, RCS96-162, MW96-188 (1997–02)). This document has disclosed a transmission-power-control method in the CDMA. Hereinafter, the disclosed contents will be described.

In the transmission-power-control, measurement of SIR representing received quality, and increase or decrease of the transmission power are cyclically performed every one slot (with a period of 0.62.5 ms). In this case, after a measured SIR and a target SIR are compared, an instruction to reduce the transmission power is sent to a base station apparatus (transmission side) when the measured value is larger, and an instruction to increase the transmission power is sent to the base station apparatus when the measured value is smaller. The base station apparatus increases or decreases the transmission power according to the above instructions.

And the base station apparatus performs outer-loop control, considering that the target SIR depends on the environments of communication terminals in order to obtain the required quality (FER: Frame Error Rate). Specifically, FER is measured in the first place, using data after decoding. After the measured FER and the target FER are compared every several frames, the target SIR is raised when the measured value is larger, and the target SIR is decreased when the measured value is smaller.

As described above, in the conventional technology, the transmission-power-control instructions are sent to the base station apparatus based on SIRs measured at the communication terminals, and, at the same time, the transmission power is controlled by changing the target SIR through the outer loop.

Here, a total-transmission-power-value which is a transmission power for communication of the base station apparatus with a plurality of communication terminals is required to be made equal to or smaller than a maximum transmission-power, as the maximum transmission-power of the base station apparatus may not be made equal to or larger than a predetermined value by restrictions in amplification circuits such as amplifiers.

However, in a conventional base station apparatus, there has been a case in which the transmission power of the base station apparatus is near the maximum total-transmission-power value, as the transmission power is increased in a simple manner in order to secure the communication quality when there is an instruction from a communication terminal to increase the transmission power, for example, due to deteriorated communication environments.

When the shortage of the transmission power is occurred, the communication quality is deteriorated by transmission at reduced transmission power. Moreover, amplifiers and so on of the base station apparatus are made in an unstable state as a system, when transmission is continued almost in a limited condition, as the requirements to increase the transmission power may not be met. Furthermore, there is a problem that a new call may not be accepted due to shortage in the transmission power.

DISCLOSURE OF INVENTION

The object of the present invention is to provide a base station apparatus, a control station apparatus, and a method for controlling transmission power, according to which a total-transmission-power-value of the base station may be appropriately controlled, not depending on the communication environments, and in a state securing the communication quality.

This object is realized by comparing a total-transmission-power-value, which is a sum of the power of signals transmitted to a plurality of communication terminals at the same time, and a reference-transmission-power-value, which is decided based on a maximum transmission-power-value at which transmission is possible with a communication apparatus such as an amplifier; by deciding allowable transmission-power-values at which the signals transmitted to each communication terminal are allowed to be transmitted; and by transmitting the signals at transmission rates which are controlled for each communication terminal, based on the allowable transmission-power-values.

BEST MODE FOR CARRYING OUT THE INVENTION

Hereinafter, embodiments of the present invention will be described, using drawings.

EMBODIMENT 1

In the present embodiment, a base station apparatus notifies a measured total-transmission-power-value to a control station apparatus, and the control station apparatus judges whether allowable transmission-power-values to be set for each communication terminal are required to be changed or not according to the notified total-transmission-power-value. The control station apparatus changes the allowable transmission-power-values if required based on the judged result. The base station apparatus controls the transmission-power-values of each communication terminal, and the total-transmission-power-value of the whole base station apparatus by switching of transmission rates based on the changed allowable transmission-power-values.

Figure 1:
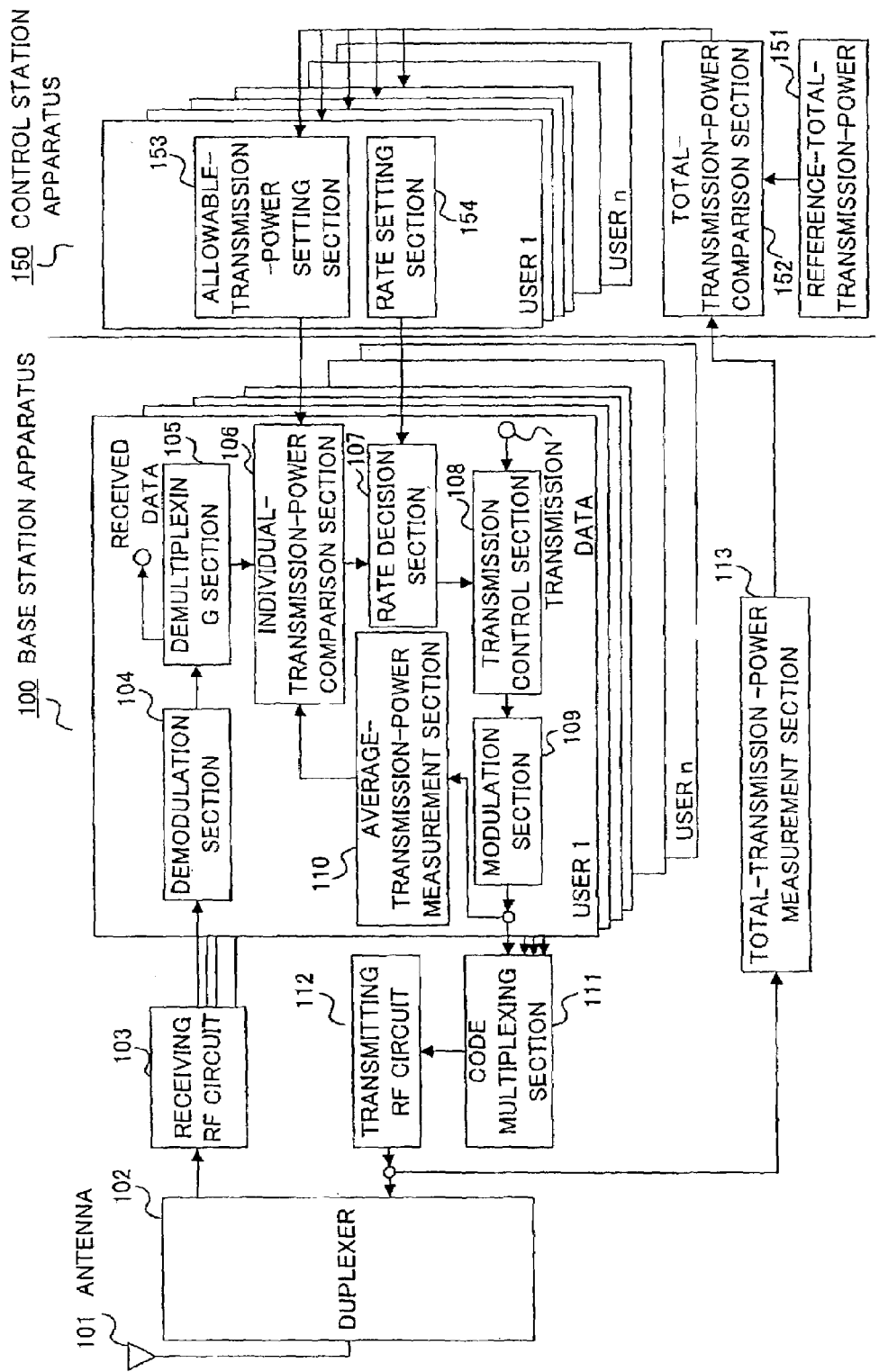
FIG. 1 is a block diagram showing a configuration of a base station apparatus and a control station apparatus according to an embodiment 1 of the present invention.

FIG. 1 is a block diagram showing a configuration of the base station apparatus and the control station apparatus according to the embodiment 1 of the present invention.

In FIG. 1, a base station apparatus 100 mainly comprises: an antenna 101; a duplexer 102; a receiving RF circuit 103; demodulation sections 104; demultiplexing sections 105; individual-transmission-power comparison sections 106; rate decision sections 107; transmission control sections 108; modulation sections 109; average-transmission-power measurement sections 110; code multiplexing sections 111; a transmitting RF circuit 112; and a total-transmission-power measurement section 113.

And, a control station apparatus 150 comprises: a reference-total-transmission-power setting section 151; a total-transmission-power comparison section 152; allowable-transmission-power setting sections 153; and rate setting sections 154.

With regard to the demodulation sections 104, the demultiplexing sections 105, the individual-transmission-power comparison sections 106, the rate decision sections 107, the transmission control sections 108, the modulation sections 109, the average-transmission-power measurement sections 110, the allowable-transmission-power setting sections 153, and the rate setting sections 154, the number of each section which is provided is equal to the number of users, and similar operations are performed at each section for users 1 through n.

The antenna 101 outputs a received radio signal as a received signal to the duplexer 102, and transmits a transmission signal output from the duplexer 102 as a radio signal. The duplexer 102 outputs the received signal input from the antenna 101 to the receiving RF circuit 103, and a transmission signal input from the transmission RF circuit 112 to the antenna 101.

The receiving RF circuit 103 amplifies the received signal input from the duplexer 102, and outputs the amplified signal to the demodulation section 104 after frequency conversion into a baseband frequency. The demodulation sections 104 fetch user signals by despreading of the received signal input from the receiving RF circuit 103, and output the user signals to the demultiplexing sections 105 after demodulation.

The demultiplexing sections 105 demultiplex the user signals input from the demodulation sections 104 into received data and transmission-rate control signals (information on received quality) including control information for switching of transmission rates, and output the transmission-rate control signals to the individual-transmission-power comparison sections 106, and the received data to the outside.

The individual-transmission-power comparison sections 106 compare average transmission-power-values input from the average-transmission-power measurement sections 110 which will be described later, and allowable transmission-power-values input from the allowable-transmission-power setting sections 153 which will be described later, and output to the rate decision sections 107 instructions to change the transmission rates.

The rate decision sections 107 output appropriate transmission rates to the transmission control sections 108 after selecting the appropriate transmission rates in a rate set of a plurality of transmission rates, which is given from the rate setting sections 154, based on the instructions, which are input from the individual-transmission-power comparison sections 106. Specifically, when the transmission rates are reduced as the average transmission-power-values become equal to or larger than the allowable transmission-power-values which have been set, the rate decision sections 107 select transmission rates which are smaller by one rank or a plurality of ranks.

And, when the transmission rates are raised as the average transmission-power-values become smaller than the set allowable transmission-power-values by X dB, the rate decision sections 107 select higher transmission rates which are corresponding to the differences between the average transmission-power-values and the set allowable transmission-power-values.

The transmission control sections 108 incorporate transmission data into frames, and output the transmission frames to the modulation sections 109 at transmission rates which are instructed from the rate decision sections 107. The modulation sections 109 output obtained transmission signals to the code multiplexing section 111 after modulation and spreading of the transmission frames input from the transmission control sections 108.

The code multiplexing section 111 multiplexes signals of a plurality of users input from the modulation sections 109, and outputs the multiplexed signal to the transmitting RF circuit 112. The transmission RF circuit 112 amplifies the transmission signal input from the code multiplexing section 11 after frequency conversion, and outputs the amplified signal to the duplexer 102.

The average-transmission-power measurement sections 110 measure the average power of the transmission signals input from the modulation sections 109, and output obtained average transmission-power-values to the individual-transmission-power comparison sections 106.

The total-transmission-power measurement section 113 measures the transmission power output from the transmitting RF circuit 112; obtains a total-transmission-power-value which is a sum of the power of signals transmitted by the base station apparatus at the same time; and outputs the obtained total-transmission-power-value to the total-transmission-power comparison section 152. The reference-total-transmission-power setting section 151 outputs a reference total-transmission-power-value, which is a target of the total-transmission-power of the base station apparatus, and has been previously set, to the total-transmission-power comparison section 152.

The total-transmission-power comparison section 152 obtains the difference in the total-transmission-power by subtraction of the reference total-transmission-power-value, which has been output from the reference-total-transmission-power setting section 151, from the total-transmission-power-value input from the total-transmission-power measurement section 113, and outputs instructions to reduce the allowable transmission-power-values to allowable-transmission-power setting sections 153 of the users 1–n, when the difference in the total-transmission-power exceeds a predetermined value.

The allowable-transmission-power setting sections 153 decide appropriate allowable transmission-power-values, based on the instructions from the total-transmission-power comparison section 152, and output the decided allowable transmission-power-values to the individual-transmission-power comparison sections 106.

The rate setting sections 154 set a rate set of a plurality of transmission rates, and output the rate set to the rate decision sections 107.

Then, operations of the base station apparatus 100 and the control station apparatus 150 according to the present embodiment will be described.

The total-transmission-power-value is obtained in the total-transmission-power measurement section 113 as a sum of the transmission power, and is output to the total-transmission-power comparison section 152. The reference total-transmission-power-value is output from the reference-total-transmission-power setting section 151 to the total-transmission-power comparison section 152.

The difference in the total-transmission-power is obtained in the total-transmission-power comparison section 152 by subtraction of the reference total-transmission-power-value from the total-transmission-power-value, and instructions to reduce the allowable transmission-power-values are output to the allowable-transmission-power setting sections 153 when the difference in the total-transmission-power exceeds a predetermined value.

The allowable transmission-power-values are set in the allowable-transmission-power setting sections 153, and are output to the individual-transmission-power comparison sections 106. When the instructions to reduce the allowable transmission-power-values are output from the total-transmission-power comparison section 152 to the allowable-transmission-power setting sections 153, allowable transmission-power-values which have been newly decided according to the instructions to reduce the previous allowable transmission-power-values are output from the allowable-transmission-power setting sections 153 to the individual-transmission-power comparison sections 106.

On the other hand, the radio signals transmitted from communication terminals are received through the antenna 101 and the duplexer 102; are converted into the baseband frequency in the receiving RF circuit 103; and are demultiplexed into the received data and pieces of information on the received quality in the demultiplexing sections 105 after despreading and demodulation in the demodulation sections 104; and the pieces of information on the received quality are output to the individual-transmission-power comparison sections 106.

And, the average transmission-power-values of signals transmitted from each user are obtained in the average-transmission-power measurement sections 110, and output to the individual-transmission-power comparison sections 106.

When the average transmission-power-values input from the average-transmission-power measurement sections 110 are larger than the allowable transmission-power-values input from the allowable-transmission-power setting sections 153, instructions to reduce the transmission rates are output from the individual-transmission-power comparison sections 106 to the rate decision sections 107.

By the instructions to reduce the transmission rates, the base station apparatus 100 transmits, for example, only the first half of one frame without changing the transmission power itself. Or, transmission is performed by the base station apparatus 100 without making the frame discontinuous by rate matching under the reduced transmission-power value. For example, burst transmission has been used for down links, and continuous transmission has been applied for up links in an existing method for changing transmission rates.

Therefore, the transmission rates are changed corresponding to the above. That is, for example, only the first halt of one frame is transmitted as a transmission signal without changing the transmission-power-value itself on the down links, and transmission is performed on up links without making the frame discontinuous by rate matching under the reduced transmission-power value.

And, when the average transmission-power-values input from the average-transmission-power measurement sections 110 are equal to or smaller than the allowable transmission-power-values output from the allowable-transmission-power setting sections 153 by predetermined values, instructions to raise the transmission rates are output from the individual-transmission-power comparison sections 106 to the rate decision sections 107.

By the instructions to raise the transmission rates, the base station apparatus 100 raises the transmission rates according to pieces of information on the differences in the individual-transmission-power representing the differences between the allowable transmission-power and the average transmission-power, and increases the transmission power within a range of the differences in the individual-transmission-power. And, transmission signals which have been accumulated may be quickly transmitted by raising the transmission rate.

Then, a method for controlling the total-transmission-power in the above base station apparatus 100 and the control station apparatus 150 with the above configuration will be described, using a flow chart in FIG. 2.

At STEP (hereinafter, called as "ST") 201, the total-transmission-power comparison section 152 obtains the difference (D1) in the total-transmission-power, which is acquired by subtraction of the reference total-transmission-power-value (Ptarget), which has been input from the reference-total-transmission-power setting section 151, from the total-transmission-power-value (Ptotal) input from the total-transmission-power measurement section 113. At ST202, the total-transmission-power comparison section 152 judges whether D1 is larger than 0 or not, and the operation is terminated when D1 is equal to, or smaller than 0.

At ST203, the total-transmission-power comparison section 152 outputs a message saying "Having exceeded the reference total-transmission-power-value by D1 dB" to the allowable-transmission-power setting sections 153, when D1 is larger than 0 at ST202. At ST204, the allowable-transmission-power setting sections 153 decide appropriate allowable transmission-power-values, based on the instructions output from the total-transmission-power comparison section 152.

Figure 3:
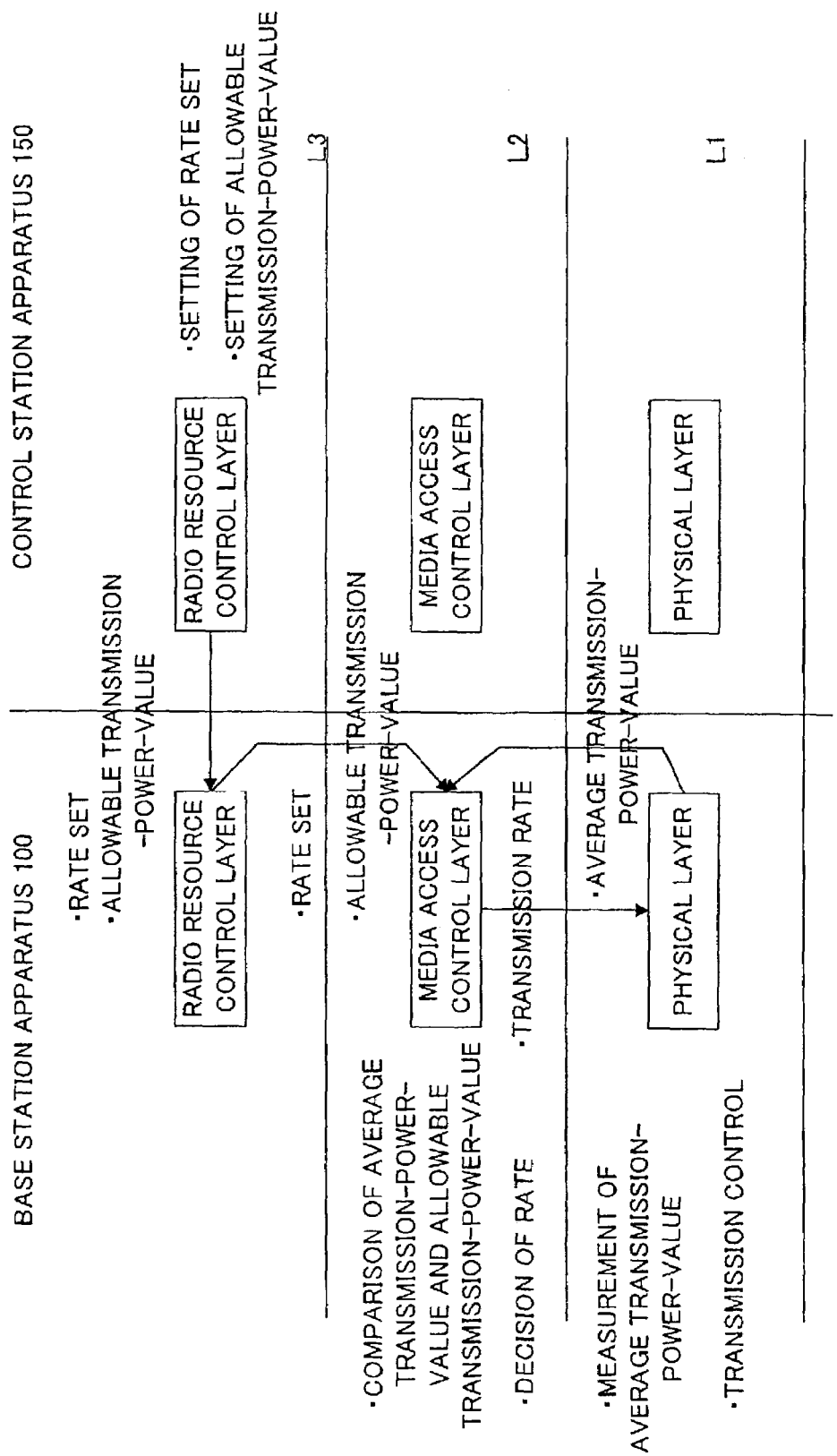
FIG. 3 is a view showing one example of signals which are notified at each layer by a method for controlling transmission rates in the base station apparatus and the control station apparatus according to the above embodiment.

Then, a method for controlling the transmission rates in the base station apparatus and the control station apparatus according to the present embodiment will be described. FIG. 3 is a view showing one example of signals which are notified at each layer by the method for controlling the transmission rates in the base station apparatus 100 and the control station apparatus 150 according to the embodiment 1 of the present invention.

In FIG. 3, L1 (layer 1) represents a physical layer; L2 (layer 2) shows a media access control layer; and L3 (layer 3) means a radio resource control layer.

The control station apparatus 150 sets at the layer 3 rate sets of selectable rates, and the allowable transmission-power-values, and notifies them to the layer 3 of the base station apparatus.

The base station apparatus 100 notifies the rate sets, and the allowable transmission-power-values, which have been notified to the layer 3, to the layer 2. And, the average transmission-power-values measured at the layer 1 of the base station apparatus are notified to the layer 2, at which the average-transmission-power-values are compared with the allowable-transmission-power-values, and the appropriate transmission rates are decided in a given rate set.

Figure 4:
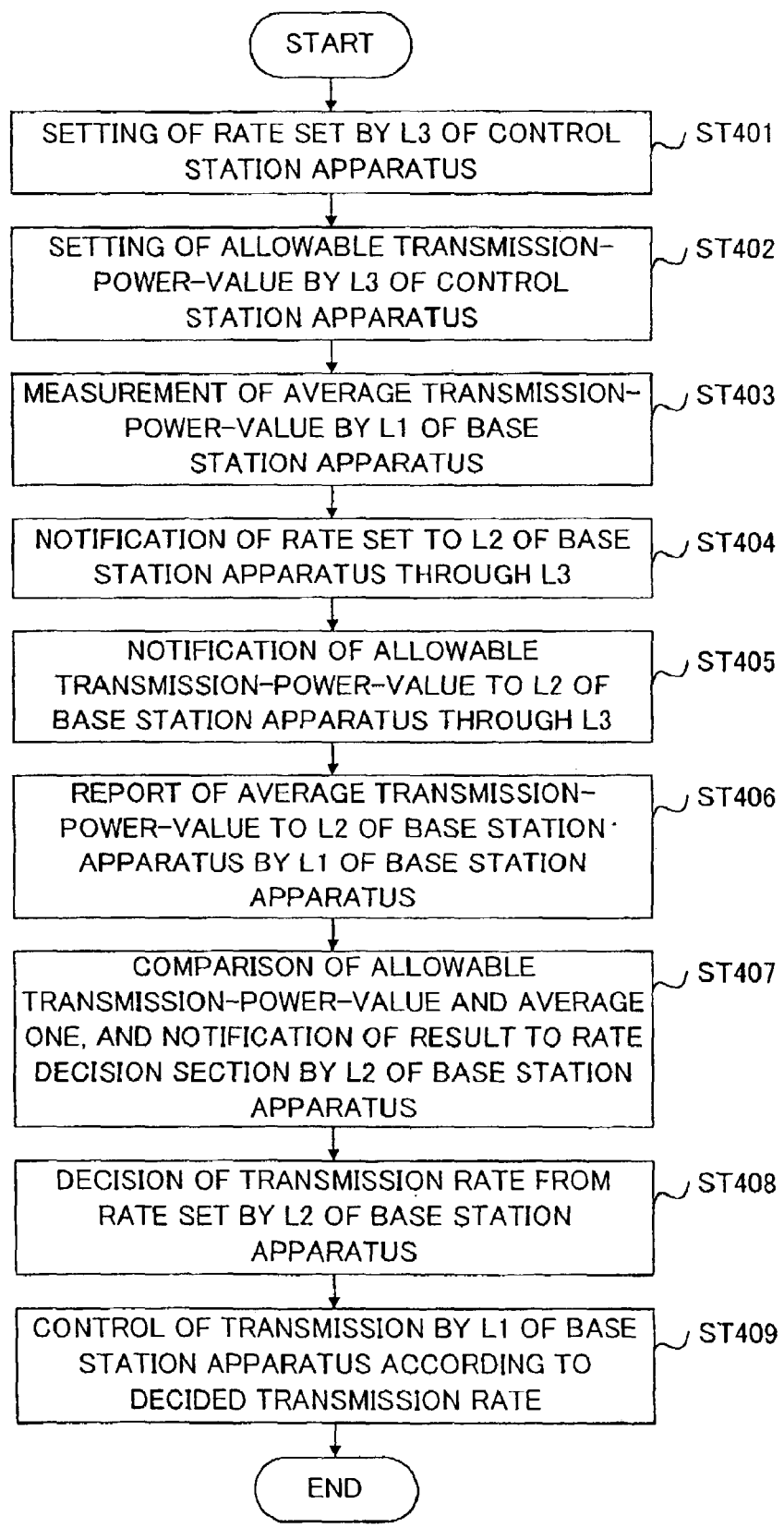
FIG. 4 is a flow chart showing the method for controlling the transmission rates in the base station apparatus and the control station apparatus according to the above embodiment.

Then, the method for controlling the transmission rates in the base station apparatus 100 and the control station apparatus 150 with the above configuration will be described, using a flow chart in FIG. 4.

At ST401, the rate setting sections 154 set the rate sets of selectable rates. At ST402, the allowable-transmission-power setting sections 153 set the allowable transmission-power-values. At ST403, the average-transmission-power measurement sections 110 measures the average transmission-power-values. At ST404, the rate sets set by the rate setting sections 154 are notified to the rate decision sections 107 at the layer 2 of the base station apparatus through the layer 3 of the base station apparatus.

At ST405, the allowable transmission-power-values set by the allowable-transmission-power setting sections 153 are notified to the individual-transmission-power comparison sections 106 at the layer 2 of the base station apparatus through the layer 3 of the base station apparatus. At ST406, the average transmission-power-values measured by the average-transmission-power measurement sections 110 are notified to the individual-transmission-power comparison sections 106. At ST407, the individual-transmission-power comparison sections 106 compare the allowable transmission-power-values and the average transmission-power-values, and notify to the rate decision sections 107 requests to change the transmission rates based on the compared results.

At ST408, the rate decision sections 107 decide the best transmission rates in a given rate set, based on the requests to change the transmission rates. At ST409, the transmission control sections 108 transmit signals to each communication terminal, based on the transmission rates decided in the rate decision sections 107.

Here, in this transmission control, for example, only the first half of one frame is transmitted without changing the transmission power itself, as described above. Or, transmission is performed without making the frame discontinuous by rate matching under the reduced transmission-power value.

Figure 5:
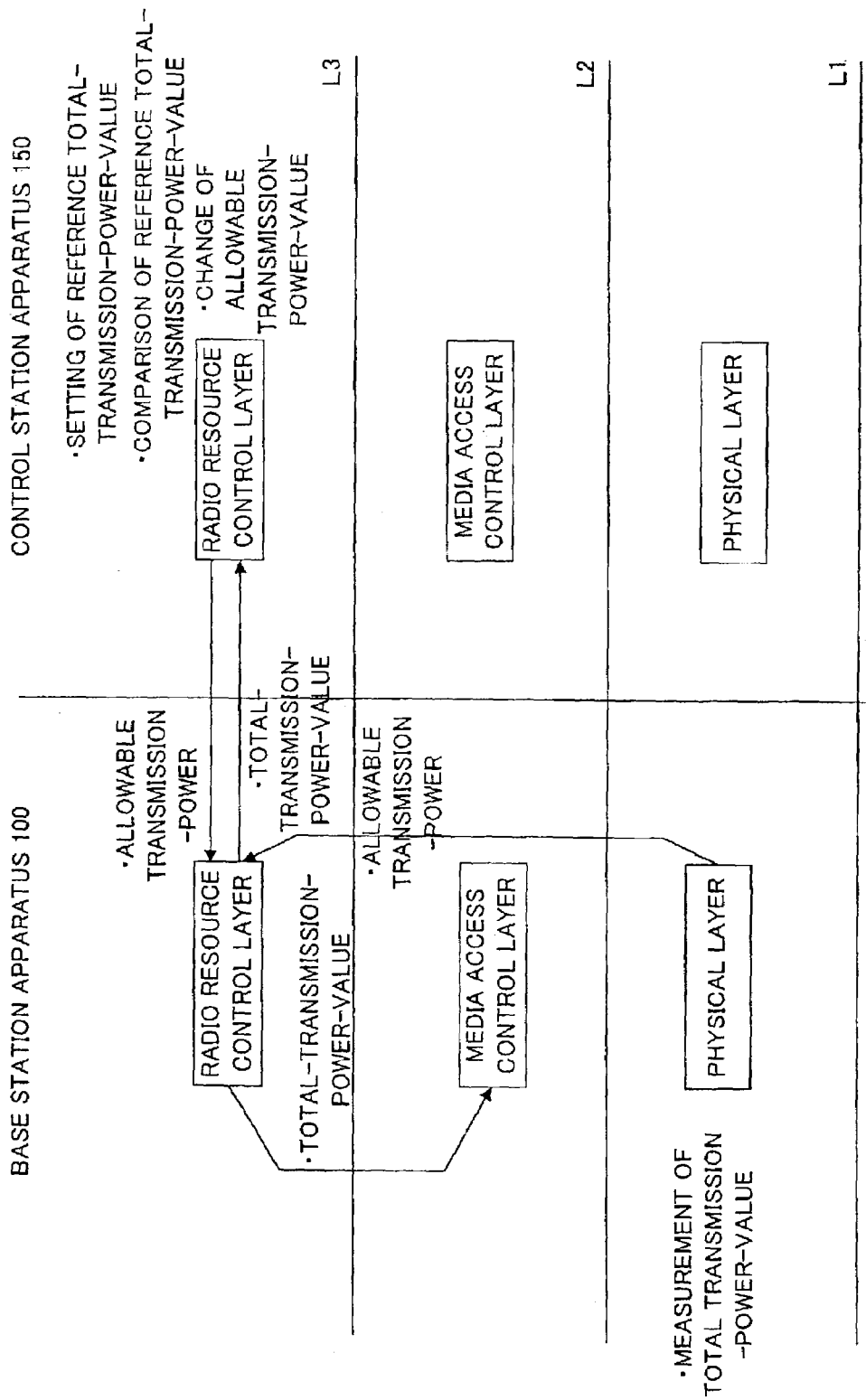
FIG. 5 is a view showing one example of signals which are notified at each layer by a method for controlling total-transmission-power in the base station apparatus and the control station apparatus according to the above embodiment.

Then, a method for controlling the total-transmission-power in the base station apparatus 100 and the control station apparatus 150 of the present embodiment will be described. FIG. 5 is a view showing one example of signals which are notified at each layer by the method for controlling the total-transmission-power in the base station apparatus 100 and the control station apparatus 150 according to the embodiment 1 of the present invention.

In FIG. 5, L1 (layer 1) represents the physical layer; L2 (layer 2) shows the media access control layer; and L3 (layer 3) means the radio resource control layer.

The base station apparatus 100 measures the total-transmission-power-value in the total-transmission-power measurement section 113 at the layer 1, and notifies the measured values to the total-transmission-power comparison section 152 in the layer 3 of the control station apparatus 150 through the layer 3. The control station apparatus 150 compares the reference total-transmission-power-value notified from the reference-total-transmission-power setting section 151, and the total-transmission-power-value notified from the layer 3 of the base station apparatus in the total-transmission-power comparison section 152. The allowable transmission-power-values are changed based on the compared results.

Figure 6:
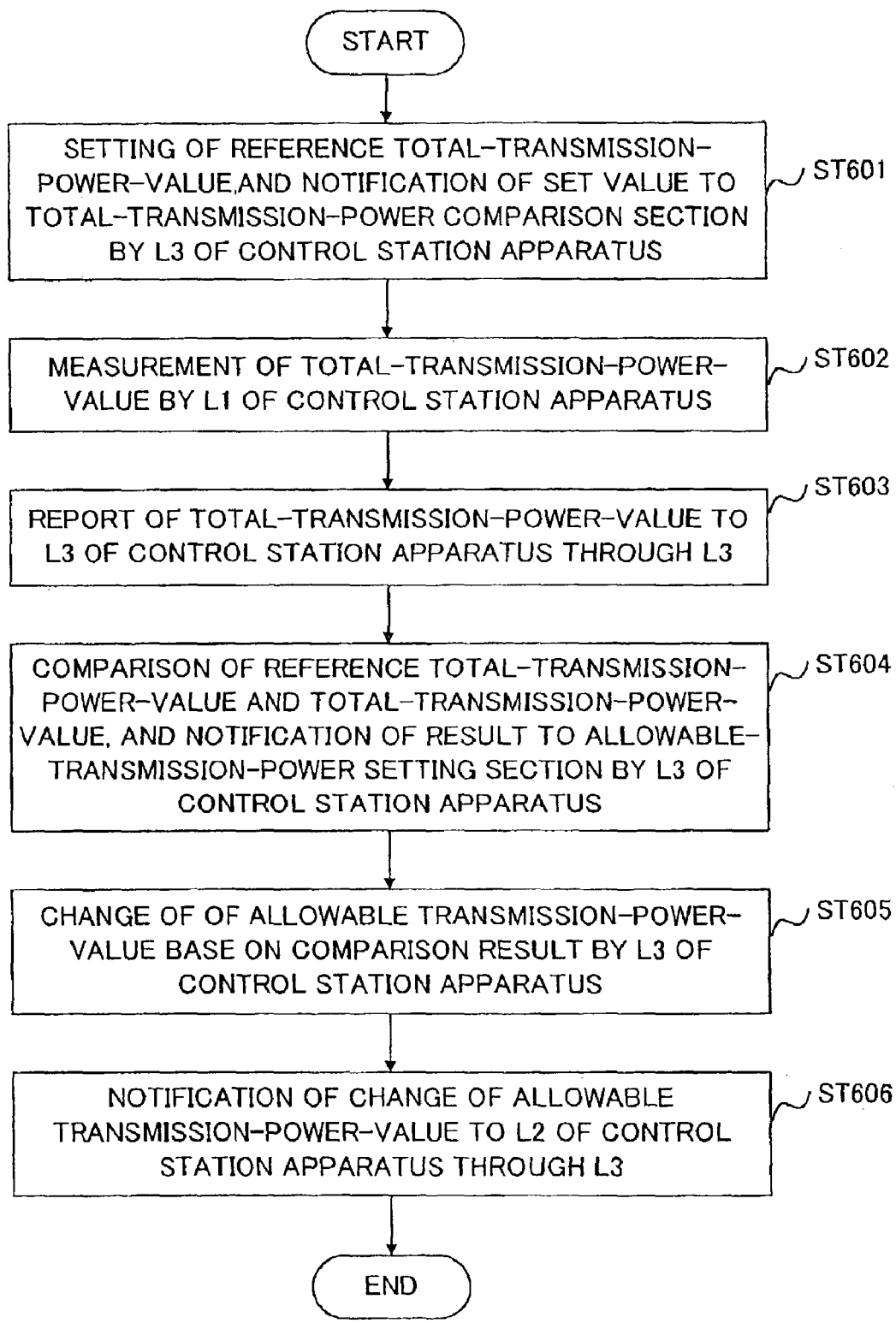
FIG. 6 is a flow chart showing a method for controlling the total-transmission-power in the base station apparatus and the control station apparatus according to the above embodiment.

Then, a method for controlling the total-transmission-power in the base station apparatus 100 and the control station apparatus 150 with the above configuration will be described, using a flow chart in FIG. 6.

At ST601, the reference-total-transmission-power setting section 151 sets the reference total-transmission-power-value, and notifies the set reference total-transmission-power-value to the total-transmission-power comparison section 152. At ST602, the total-transmission-power measurement section 113 measures the total-transmission-power-value. At ST603, the total-transmission-power-value measured in the total-transmission-power measurement section 113 is notified to the total-transmission-power comparison section 152 at the layer 3 of the control station apparatus through the layer 3.

At ST604, the total-transmission-power comparison section 152 compares the reference total-transmission-power-value and the total-transmission-power-value, and notifies requests to change the allowable transmission-power values based on the compared results to the allowable-transmission-power setting sections 153. At ST605, the allowable-transmission-power setting sections 153 change the allowable transmission-power-values into appropriate allowable transmission-power-values based on the requests to change the allowable transmission-power-values.

At ST606, the allowable-transmission-power setting sections 153 notify the allowable transmission-power-values changed through the layer 3 of the base station apparatus to the individual-transmission-power comparison sections 106 at the layer 2 of the base station apparatus.

Figure 2:
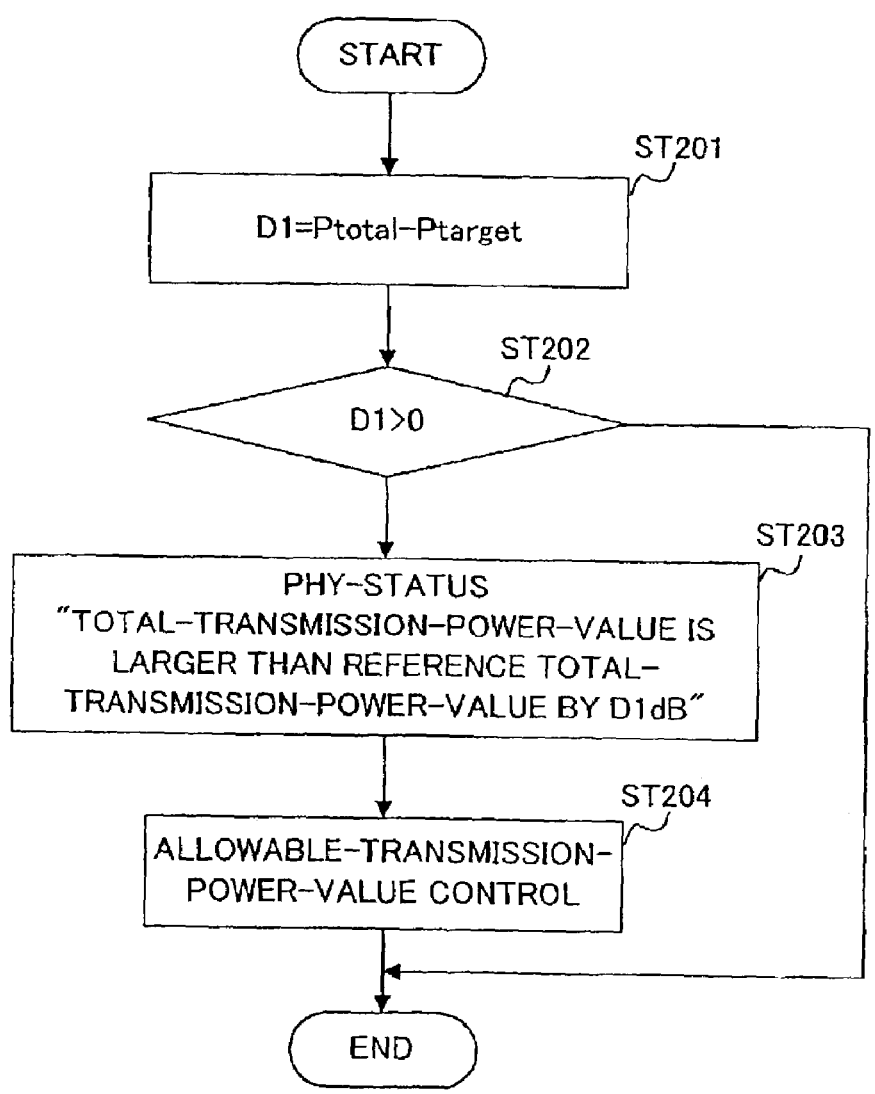
FIG. 2 is a flow chart showing a method for controlling the total-transmission-power in the base station apparatus and the control station apparatus according to the above embodiment.

Here, the allowable transmission-power-values are changed for each user according to the flow chart shown in FIG. 2.

Thus, using the base station apparatus and the control station apparatus according to the present embodiment, the allowable transmission-power-values to be set are changed for each communication terminal according to changes in the total-transmission-power-value which has been measured in the base station apparatus. As the transmission rates are changed, based on the changed allowable transmission-power-values, the total-transmission-power-value of the base station apparatus may be kept at a predetermined value in a state securing the communication quality of each communication terminal.

Here, though the individual-transmission-power comparison sections 106 and the rate decision sections 107 are arranged in the base station apparatus 100, and the allowable-transmission-power setting sections 153 and the rate setting sections 154 are arranged in the control station apparatus 150 in FIG. 1, the arrangements of these components are not limited to the above arrangements, and each group of the components may be interchangeably arranged in the control station apparatus 150 or the base station apparatus 100.

Moreover, the average transmission-power and the total-transmission-power may be measured not only in synchronous processing, but also in asynchronous processing. In this case, the changes in the transmission rates according to the allowable transmission-power-values, and the changes in the allowable transmission-power-values by the total-transmission-power-values are asynchronously performed.

And, only the judgment whether "not change" or "reduction in the values before the changes" may be acceptable for setting the allowable transmission-power-values. Moreover, instructions to reduce the allowable transmission-power-values, for example, by X dB may be included at setting of the allowable transmission-power-values. And, the allowable transmission-power-values may be changed by an amount in proportion to the difference between the total-transmission-power-value and the reference total-transmission-power-value. In addition, a method of reduction by a predetermined value may be used.

EMBODIMENT 2

In the present embodiment, a base station apparatus judges whether allowable transmission-power-values to be set for each communication terminal are required to be changed or not according to a measured total-transmission-power-value. Only when the judged result requires the changes, the base station apparatus notifies the request to change the allowable transmission-power-values to the control station apparatus, and the allowable transmission-power-values are changed by the control station apparatus. The base station apparatus controls the transmission-power-values of each communication terminal, and the total-transmission-power-value of the whole base station apparatus by switching of transmission rates based on the changed allowable transmission-power-values.

Figure 7:
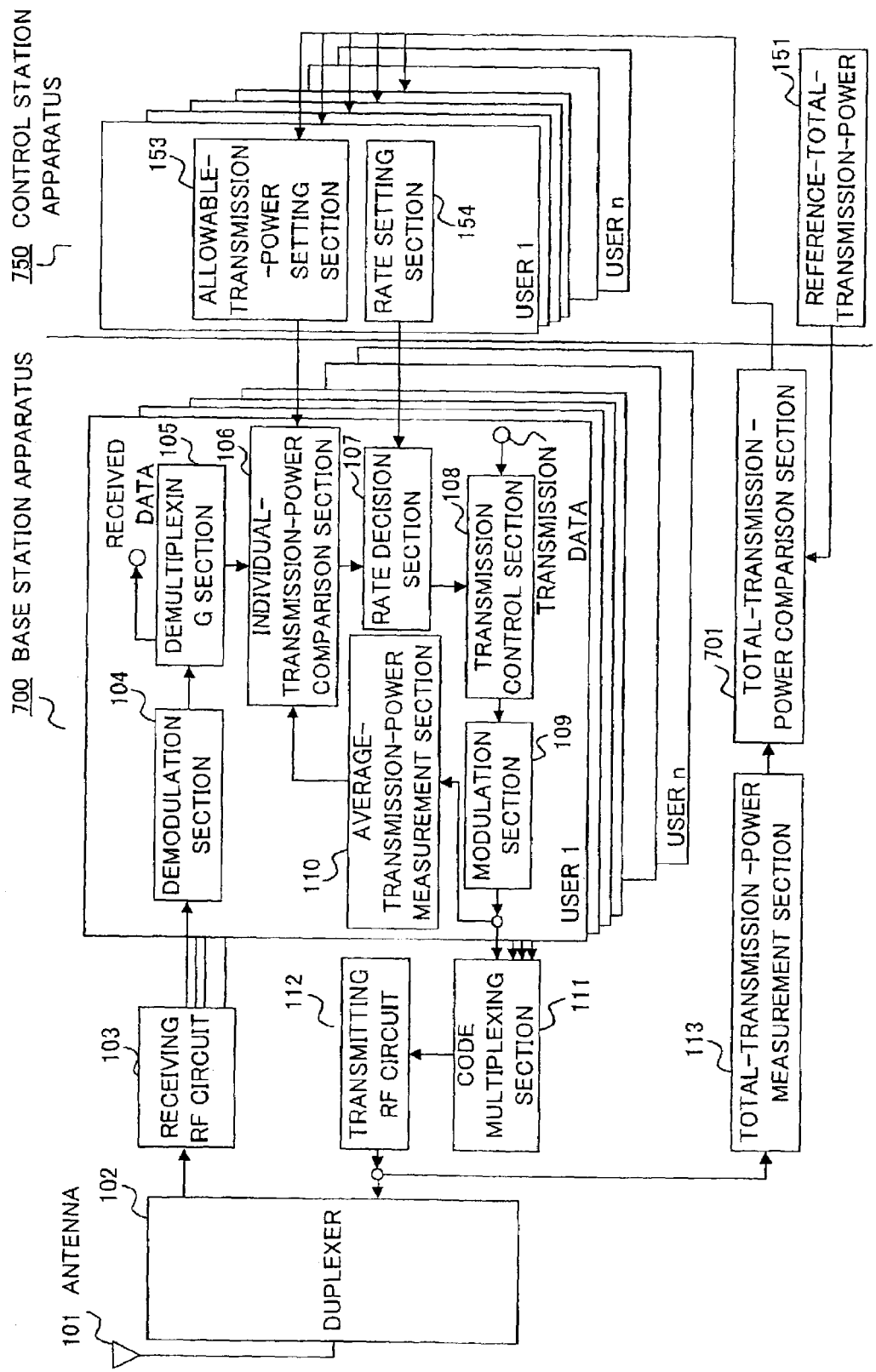
FIG. 7 is a block diagram showing a configuration of a base station apparatus and a control station apparatus according to an embodiment 2 of the present invention.

FIG. 7 is a block diagram showing a configuration of the base station apparatus and the control station apparatus according to the embodiment 2 of the present invention. However, common components to those in FIG. 1 are denoted by the same reference numbers as those in FIG. 1, and detailed description will be eliminated. There is a difference between FIG. 7 and FIG. 1 in a point that a base station apparatus 700 in FIG. 7 comprises a total-transmission-power comparison section 701 in which it is judged whether the allowable transmission-power-values are required to be changed or not.

In FIG. 7, a total-transmission-power measurement section 113 measures transmission power input from a transmitting RF circuit 112; obtains a total-transmission-power-value which is a sum of the power of signals transmitted by the base station apparatus at the same time; and outputs the obtained total-transmission-power-value to the total-transmission-power comparison section 701. A reference-total-transmission-power setting section 151 sets a reference total-transmission-power-value, which is a target of the total-transmission-power-value which is output by the base station apparatus, and outputs the reference total-transmission-power-value to the total-transmission-power comparison section 701.

The total-transmission-power comparison section 701 obtains, the difference in the total-transmission-power by subtraction of the reference total-transmission-power-value, which has been input from the reference-total-transmission-power setting section 151, from the total-transmission-power-value input from the total-transmission-power measurement section 113, and outputs instructions to reduce the allowable transmission-power-values to allowable-transmission-power setting sections 153 of users 1–n, when the difference in the total-transmission-power exceeds a predetermined value.

Figure 8:
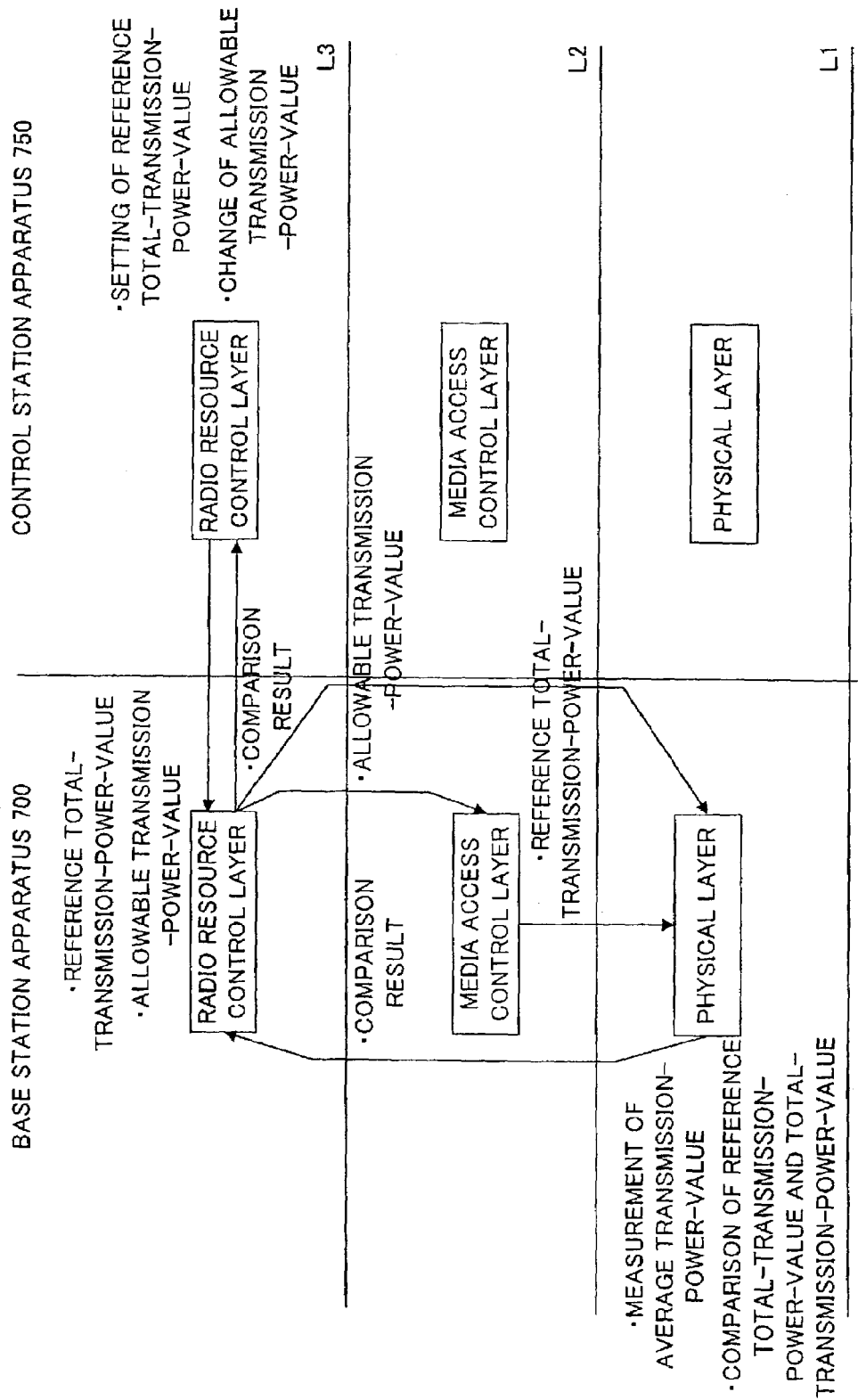
FIG. 8 is a view showing one example of signals which are notified at each layer by the method for controlling the total-transmission-power in the base station apparatus and the control station apparatus according to the above embodiment.

Then, a method for controlling the total-transmission-power in the base station apparatus and the control station apparatus according to the present embodiment will be described. FIG. 8 is a view showing one example of signals which are notified at each layer by the method for controlling the total-transmission-power in the base station apparatus 100 and the control station apparatus 150 according to the embodiment 2 of the present invention.

In FIG. 8, L1 (layer 1) represents a physical layer; L2 (layer 2) shows a media access control layer; and L3 (layer 3) means a radio resource control layer.

The control station apparatus 750 sets the reference total-transmission-power-value in the reference-total-transmission-power setting section 151 at the layer 3, and notifies the set reference total-transmission-power-value to the total-transmission-power comparison section 701 at the layer 1 through the layer 3 of the base station apparatus.

Figure 9:
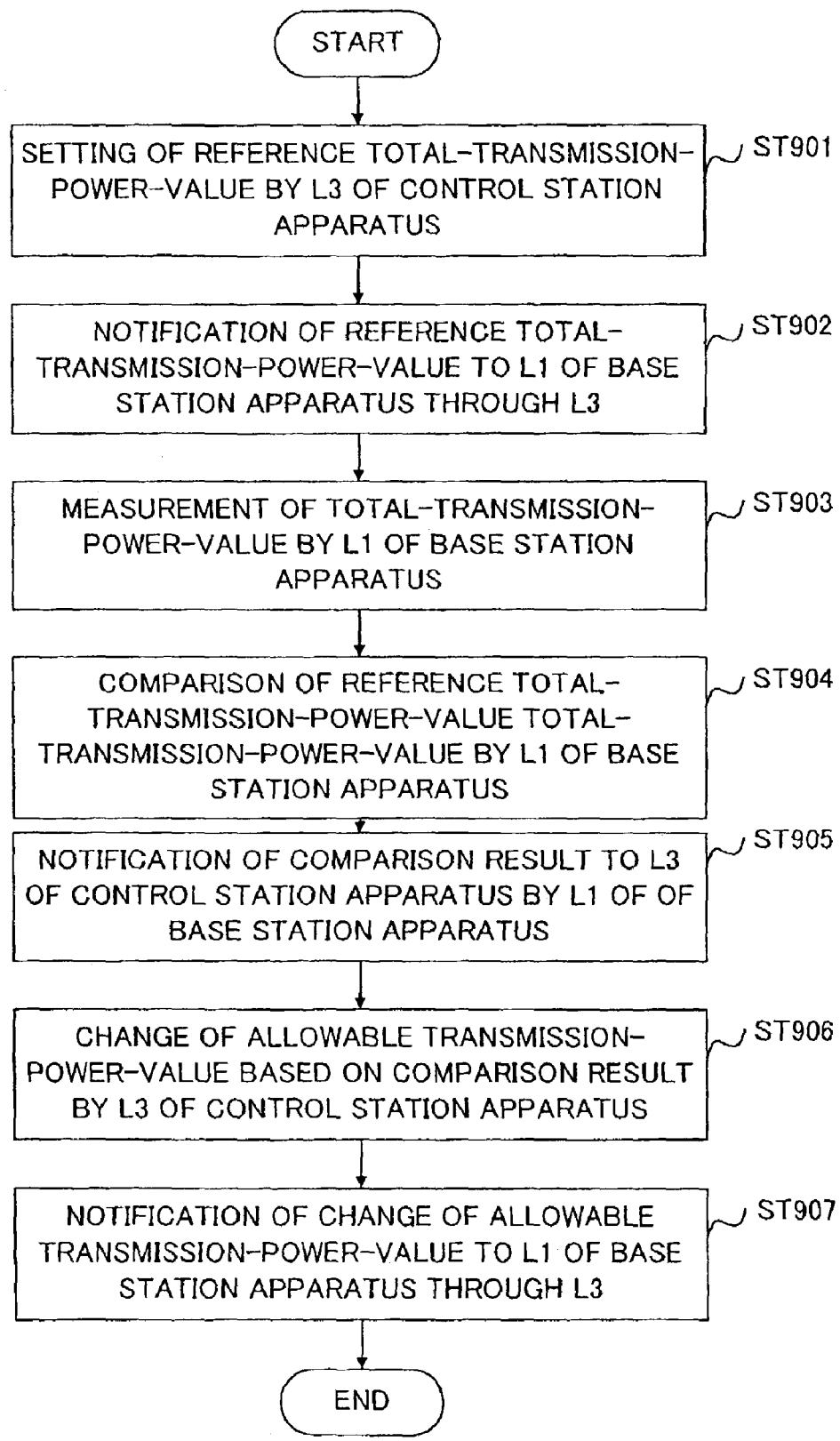
FIG. 9 is a flow chart showing the method for controlling the total-transmission-power in the base station apparatus and the control station apparatus according to the above embodiment.

The base station apparatus 700 measures the total-transmission-power-value in the total-transmission-power measurement section 113 at the layer 1, and compares, in the total-transmission-power comparison section 701, the reference total-transmission-power-value notified from the control station apparatus and the total-transmission-power-value measured in the total-transmission-power measurement section 113. When it is required after the comparison to change the allowable transmission-power-values, the comparison result is notified to the allowable-transmission-power setting sections 153 at the layer 3 of the control station apparatus through the layer 3. The allowable transmission-power-values which have been changed in the allowable-transmission-power setting sections 153 when required are notified to individual-transmission-power comparison sections 106 at the layer 2 through the layer 3 of the base station apparatus Then, the method for controlling the total-transmission-power in the base station apparatus 700 and the control station apparatus 750 with the above configuration will be described, using a flow chart in FIG. 9.

At ST901, the reference-total-transmission-power setting section 151 sets the reference total-transmission-power-value. At ST902, the reference-total-transmission-power setting section 151 notifies the set reference total-transmission-power-value to the total-transmission-power comparison section 701 at the layer 1 through the layer 3 of the base station apparatus.

At ST903, the total-transmission-power measurement section 113 measures the total-transmission-power-value, and notifies the measured value to the total-transmission-power comparison section 701. At ST904, the total-transmission-power comparison section 701 compares the reference total-transmission-power-value and the total-transmission-power-value. At ST905, the total-transmission-power comparison section 701 notifies the comparison result to the allowable-transmission-power setting sections 153 through the layer 3 of the base station apparatus.

At ST906, the allowable-transmission-power setting sections 153 change the allowable transmission-power-values based on the requests to change the total-transmission-power-value. At ST907, the allowable-transmission-power setting sections 153 notify the changed allowable transmission-power-values to the individual-transmission-power comparison sections 106 at the layer 1 through the layer 3 of the base station apparatus.

Here, the allowable transmission-power-values are changed for each user according to the flow chart shown in FIG. 2.

Thus, in the base station apparatus and the control station apparatus according to the present embodiment, requests to change the allowable transmission-power-values are notified to the control station apparatus, in which the allowable transmission-power-values are changed, only when it is required to change the allowable transmission-power-values to be set for each communication terminal according to changes in the total-transmission-power-value which has been measured in the base station apparatus. As the transmission rates are changed, based on the changed allowable transmission-power-values, the total-transmission-power-value of the base station apparatus may be kept at a predetermined value in a state securing the communication quality of each communication terminal through exchange of smaller number of control signals between the control apparatus and the base station apparatus.

Here, though the individual-transmission-power comparison sections 106 and the rate decision sections 107 are arranged in the base station apparatus 100, and the allowable-transmission-power setting sections 153 and the rate setting sections 154 are arranged in the control station apparatus 150 in FIG. 7, the arrangement of these components is not limited to the above arrangements, and each group of the components may be interchangeably arranged in the control station apparatus 150 or the base station apparatus 100.

Moreover, the average transmission-power and the total-transmission-power may be measured not only in synchronous processing, but also in asynchronous processing.

In this case, the changes in the transmission rates according to the allowable transmission-power-values, and the changes in the allowable transmission-power-values by the total-transmission-power-values are asynchronously performed.

EMBODIMENT 3

In the present embodiment, a control station apparatus decides transmission-power-values of signals transmitted to each communication terminal, using an instruction to change a total-transmission-power-value, and priority information from a base station apparatus.

Figure 10:
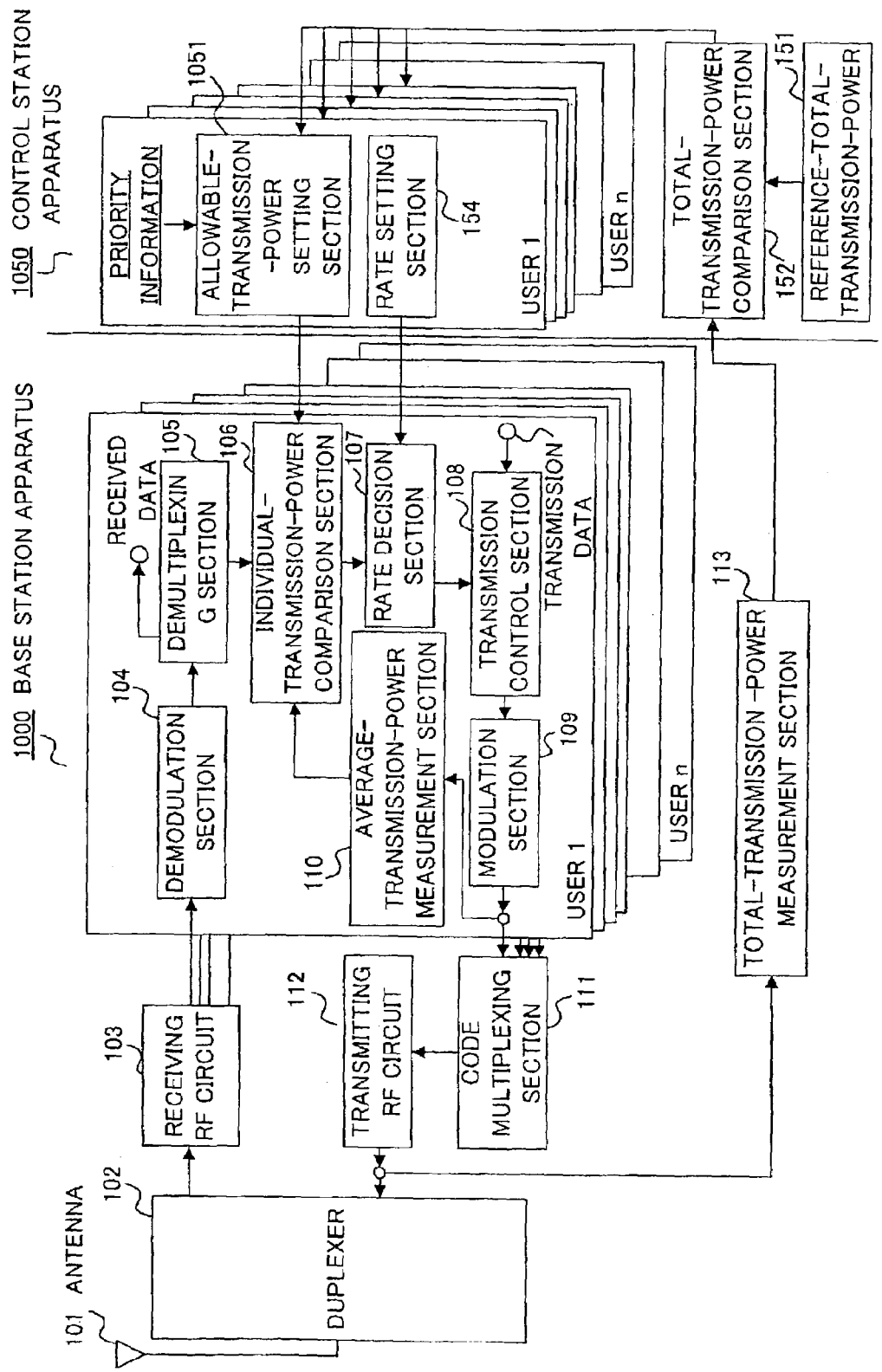
FIG. 10 is a block diagram showing a configuration of a base station apparatus and a control station apparatus according to an embodiment 3 of the present invention.

FIG. 10 is a block diagram showing a configuration of the base station apparatus and the control station apparatus according to the embodiment 3 of the present invention. However, common components to those in FIG. 1 are denoted by the same reference numbers as those in FIG. 1, and detailed description will be eliminated. There is a difference between allowable-transmission-power setting sections 1051 in a control station apparatus 1050 in FIG. 10, and allowable-transmission-power setting sections 153 in the control station apparatus 150 in FIG. 1 in a point that the allowable-transmission-power setting sections 1051 decide appropriate allowable transmission-power-values, based on priority information which will be described later.

In FIG. 10, individual-transmission-power comparison sections 106 compare average transmission-power-values input from average-transmission-power measurement sections 110, and allowable transmission-power-values input from the allowable-transmission-power setting sections 1051 which will be described later, and output to rate decision sections 107 instructions to change the transmission power.

A total-transmission-power comparison section 152 obtains the difference in the total-transmission-power by subtraction of a reference total-transmission-power-value, which has been input from a reference-total-transmission-power setting section 151, from the total-transmission-power-value input from a total-transmission-power measurement section 113, and outputs instructions to reduce the allowable transmission-power-values to the allowable-transmission-power setting sections 1051 of users 1–n, when the difference in the total-transmission-power is larger than 0.

The allowable-transmission-power setting sections 1051 decide appropriate allowable transmission-power-values, based on the instructions from the total-transmission-power comparison section 152, and pieces of priority information which are information on priority by which power values of signals transmitted to each user, and output the decided allowable transmission-power-values to the individual-transmission-power comparison sections 106.

For example, the priority information is set according to conditions such as QoS (Quality of Service) of users, the kind of service, and a data transfer method at the layers 2. As one example, when two levels of High and Low are adopted as the priority information, the allowable transmission-power-values are assumed to be variable only for users with the High-level priority information, and there is no change in the allowable transmission-power-values for users with the Low-level priority information, even when requests to change the allowable transmission-power-values are notified from the total-transmission-power comparison section 152. Moreover, for example, the changes in the allowable transmission-power-values are set according to the priority, when there are a plurality of ranks in the priority.

Figure 11:
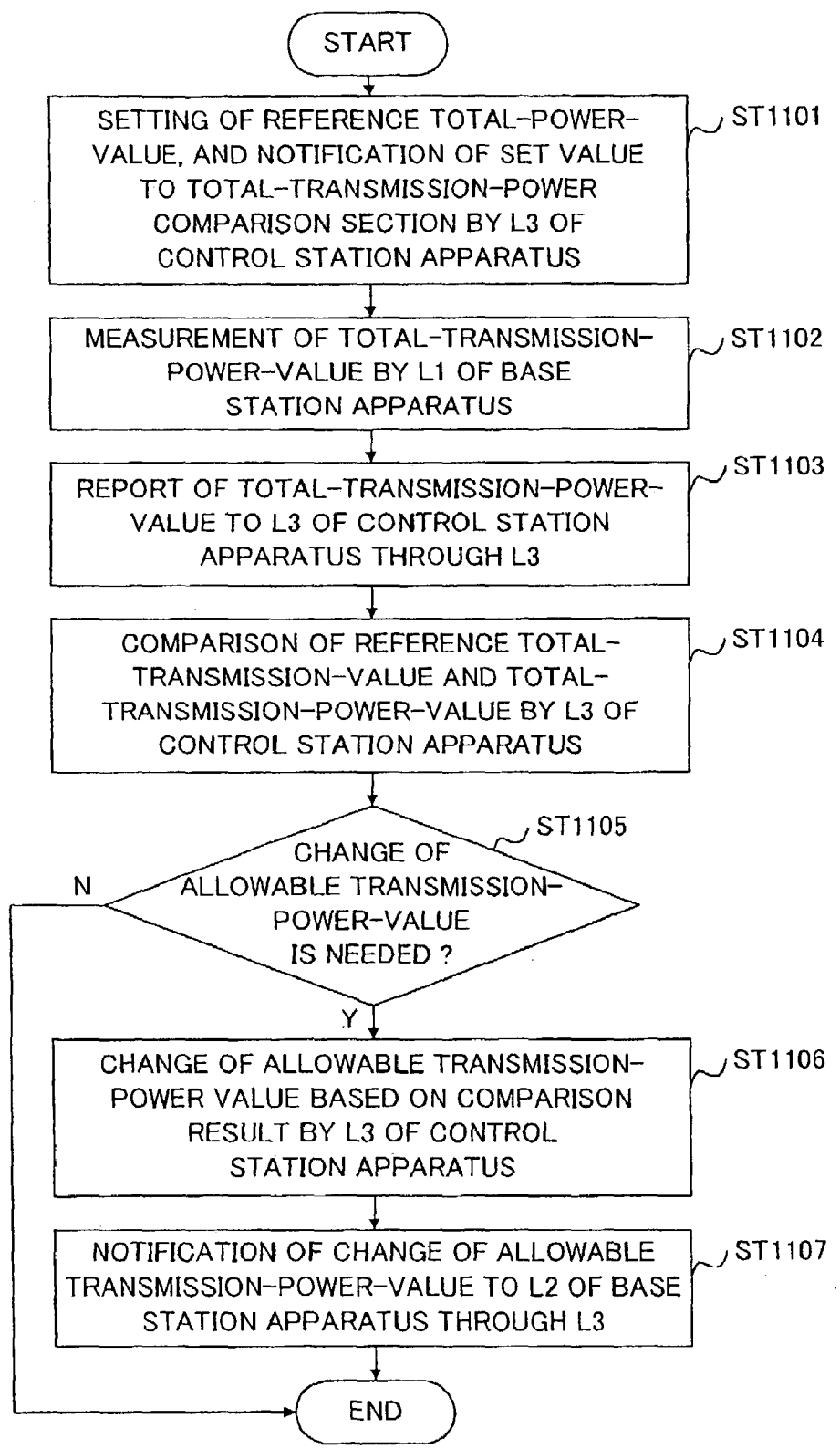
FIG. 11 is a flow chart showing a method for controlling the total-transmission-power in the base station apparatus and the control station apparatus according to the above embodiment.

Then, a method for controlling the total-transmission-power in the base station apparatus 100 and the control station apparatus 1050 with the above configuration will be described, using a flow chart in FIG. 11.

At ST1101, the reference-total-transmission-power setting section 151 sets the reference total-transmission-power-value, and the set reference total-transmission-power-value is notified to the total-transmission-power comparison section 152. At ST1102, the total-transmission-power measurement section 113 measures the total-transmission-power-value. At ST1103, the total-transmission-power-value which the total-transmission-power measurement section 113 has measured is notified to the total-transmission-power comparison section 152 at the layer 3 of the control station apparatus through the layer 3. At ST1104, the total-transmission-power comparison section 152 compares the total-transmission-power-value and the reference total-transmission-power-value, and requests to change the allowable transmission-power-values, based on the compared result, are notified to the allowable-transmission-power setting sections 1051.

At ST1105, the allowable-transmission-power setting sections 1051 judge whether the allowable transmission-power-values are required to be changed based on the priority information for each user. When the allowable transmission-power-values are not required to be changed on the judged results, the processing is terminated. When the allowable transmission-power-values are required to be changed, the allowable transmission-power-values are changed at ST1106, based on the priority information, and the comparison results from the total-transmission-power comparison section 152.

At ST1107, the allowable transmission-power-values which the allowable-transmission-power setting sections 1051 have changed through the layer 3 of the base station apparatus are notified to the individual-transmission-power comparison sections 106 at the layer 2 of the base station apparatus.

Here, the allowable transmission-power-values are changed for each user according to the flow chart shown in FIG. 2.

Thus, in the base station apparatus and the control station apparatus according to the present embodiment, changes in the allowable transmission-power-values are decided for each terminal, based on instructions requesting to change the allowable transmission-power-values and the priority information which has been previously set for each user, when the fluctuating total-transmission-power-value of the base station apparatus exceeds the reference total-transmission-power-value, and the total-transmission-power-value of the base station apparatus may be more precisely controlled corresponding to communication conditions of each user in a state securing the communication quality of each communication terminal through switching of the transmission rates according to the changed allowable transmission-power-values.

EMBODIMENT 4

In a base station apparatus and a control station apparatus according to the present embodiment, requests to change allowable transmission-power-values are notified to the control station apparatus, only when the set allowable transmission-power-values to be set for each communication terminal are required to be changed according to changes in a total-transmission-power-value measured in the base station apparatus, and the control station apparatus changes for each communication terminal the allowable transmission-power-values, based on requests from the base station apparatus to change the allowable transmission-power, and on priority information for each user. Transmission-power values of each communication terminal are controlled by switching transmission rates based on the changed allowable transmission-power-values, and the total-transmission-power-value of the whole base station is controlled.

Figure 12:
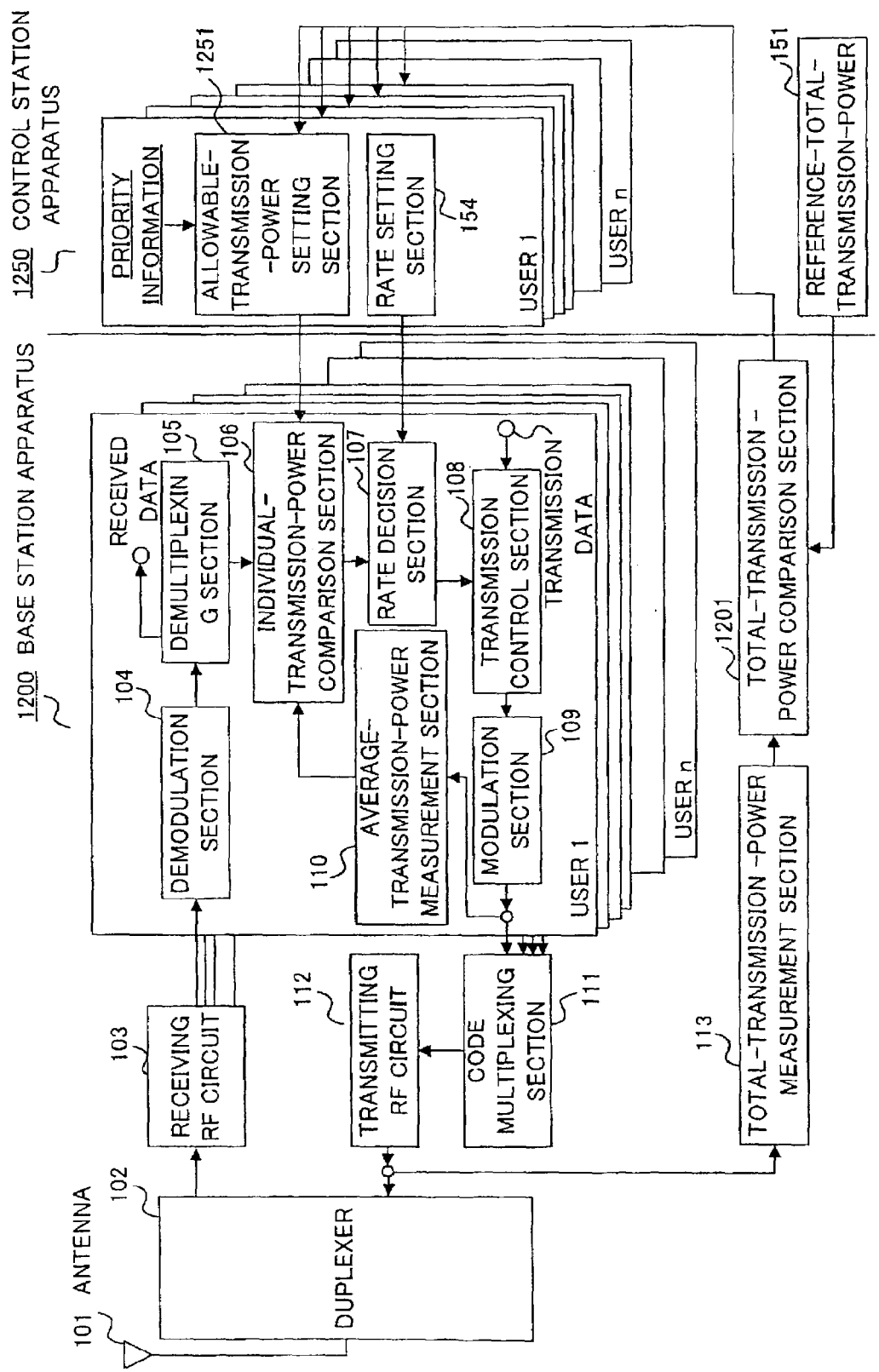
FIG. 12 is a block diagram showing a configuration of a base station apparatus and a control station apparatus according to an embodiment 4 of the present invention.

FIG. 12 is a block diagram showing a configuration of the base station apparatus and the control station apparatus according to the embodiment 4 of the present invention. However, common components to those in FIG. 1 are denoted by the same reference numbers as those in FIG. 1, and detailed description will be eliminated. There is a difference between FIG. 12 and FIG. 1 in a point that a base station apparatus 1200 in FIG. 12 comprises a total-transmission-power comparison section 1201 in which it is judged whether the allowable transmission-power-values are required to be changed or not. And, there is another difference between FIG. 12 and FIG. 1 in a point that allowable-transmission-power setting sections 1251 in FIG. 12 decide appropriate allowable transmission-power values based on priority information which will be described later.

In FIG. 12, individual-transmission-power comparison sections 106 compare average transmission-power-values input from average-transmission-power measurement sections 110, and the allowable transmission-power-values input from the allowable-transmission-power setting section 1251, and output instructions to change the transmission power to a rate decision sections 107.

A total-transmission-power measurement section 113 measures transmission power input from a transmitting RF circuit 112; obtains the total-transmission-power-value which is a sum of the power of signals transmitted by the base station apparatus at the same time; and outputs the obtained total-transmission-power-value to the total-transmission-power comparison section 1201.

A reference-total-transmission-power setting section 151 sets a reference total-transmission-power-value, which is a target of the total-transmission-power-value which is output by the base station apparatus, and outputs the reference total-transmission-power-value to the total-transmission-power comparison section 1201.

The total-transmission-power comparison section 1201 obtains the total-transmission-power-value by subtraction of the reference total-transmission-power-value input from the reference-total-transmission-power setting section 151, from the total-transmission-power-value input from the total-transmission-power measurement section 113, and outputs instructions to reduce the allowable transmission-power-values to the allowable-transmission-power setting sections 1251 of users 1–n, when the difference in the total-transmission-power is larger than 0.

The allowable-transmission-power setting sections 1251 decide appropriate allowable transmission-power-values, based on the instructions output from the total-transmission-power comparison section 1201, and pieces of priority information which are information on priority orders by which the allowable transmission-power-values are changed, and output the decided allowable transmission-power-values to the individual-transmission-power comparison sections 106.

Figure 13:
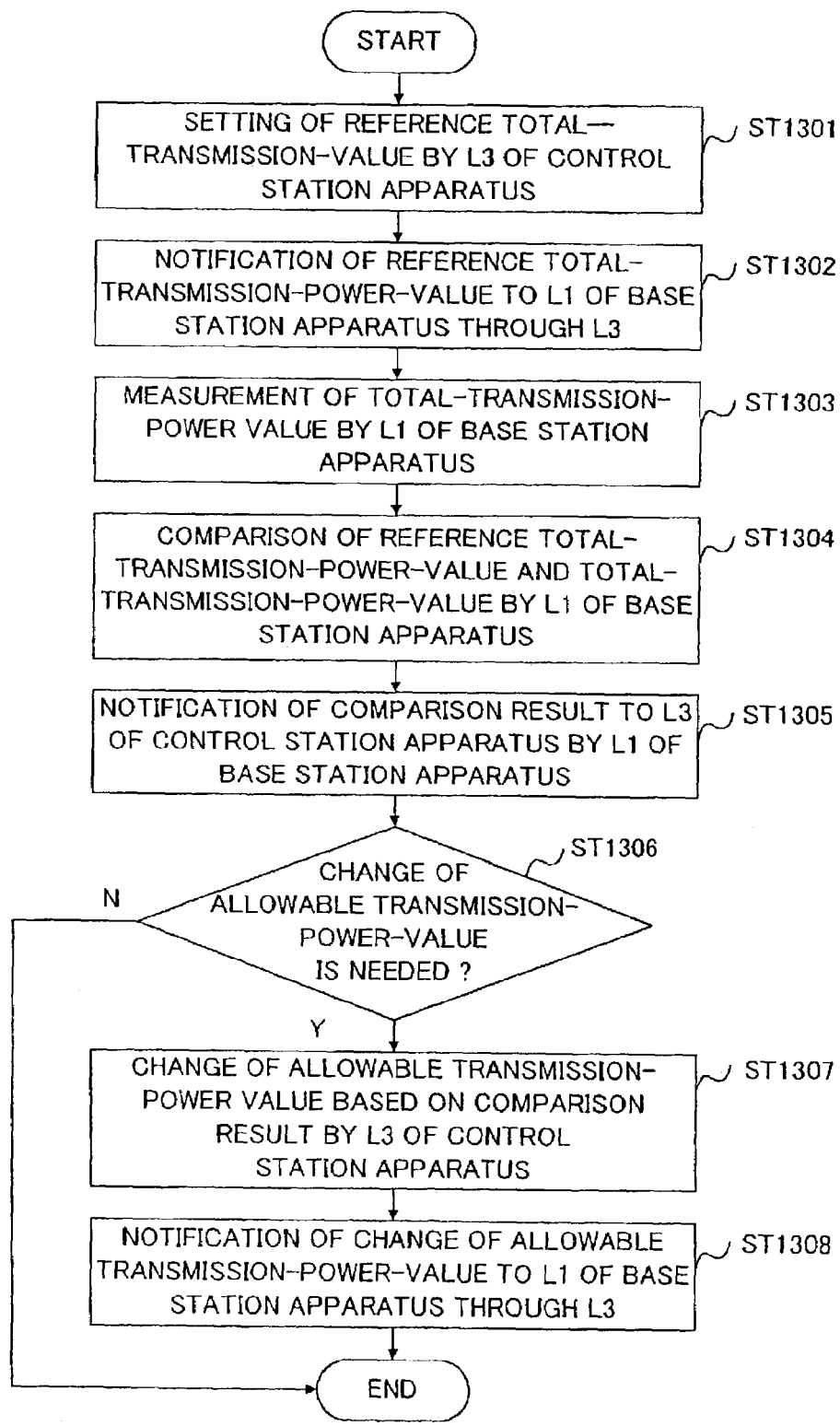
FIG. 13 is a flow chart showing a method for controlling the total-transmission-power in the base station apparatus and the control station apparatus according to the above embodiment.

Then, a method for controlling the total-transmission-power in the control station apparatus 1250 with the above configuration will be described, using a flow chart in FIG. 13.

At ST1301, the reference-total-transmission-power setting section 151 sets the reference total-transmission-power-value. At ST1302, the reference-total-transmission-power setting section 151 notifies the set reference total-transmission-power-value to the total-transmission-power comparison section 1201 at the layer 1 of the base station apparatus through the layer 3 of the base station apparatus.

At ST1303, the total-transmission-power measurement section 113 measures the total-transmission-power-value, and notifies the measured value to the total-transmission-power comparison section 1201. At ST1304, the total-transmission-power comparison section 1201 compares the total-transmission-power-value and the reference total-transmission-power-value. At ST1305, the total-transmission-power comparison section 1201 notifies the compared result to the allowable-transmission-power setting sections 1251 through the layer 3 of the base station apparatus.

At ST1306, the allowable-transmission-power setting sections 1251 judge whether the allowable transmission-power-values are required to be changed or not based on the priority information for each user. When the allowable transmission-power-values are not required to be changed on the judged results, the processing is terminated. When the allowable transmission-power-values are required to be changed, the allowable transmission-power-values are changed at ST1307, based on the priority information and the comparison result from the total-transmission-power comparison section 1201.

At ST1308, the allowable-transmission-power setting sections 1251 notify the allowable transmission-power-values, which have been changed through the layer 3 of the base station apparatus, to the individual-transmission-power comparison section 106 at the layer 2 of the base station apparatus.

Thus, in the base station apparatus and the control station apparatus according to the present embodiment, requests to change the allowable transmission-power-values are notified to the control station apparatus, only when it is required to change the allowable transmission-power-values to be set for each communication terminal according to changes in the total-transmission-power-value measured in the base station apparatus; and the control station apparatus changes the allowable transmission-power-values to be set for each terminal, based on instructions requesting to change the allowable transmission-power-values, and the priority information. The total-transmission-power-value of the base station apparatus may be more precisely controlled corresponding to communication conditions in a state securing the communication quality through switching of the transmission rates based on the changed allowable transmission-power-values, and through exchange of smaller number of control signals between the control apparatus and the base station apparatus.

EMBODIMENT 5

Figure 14:
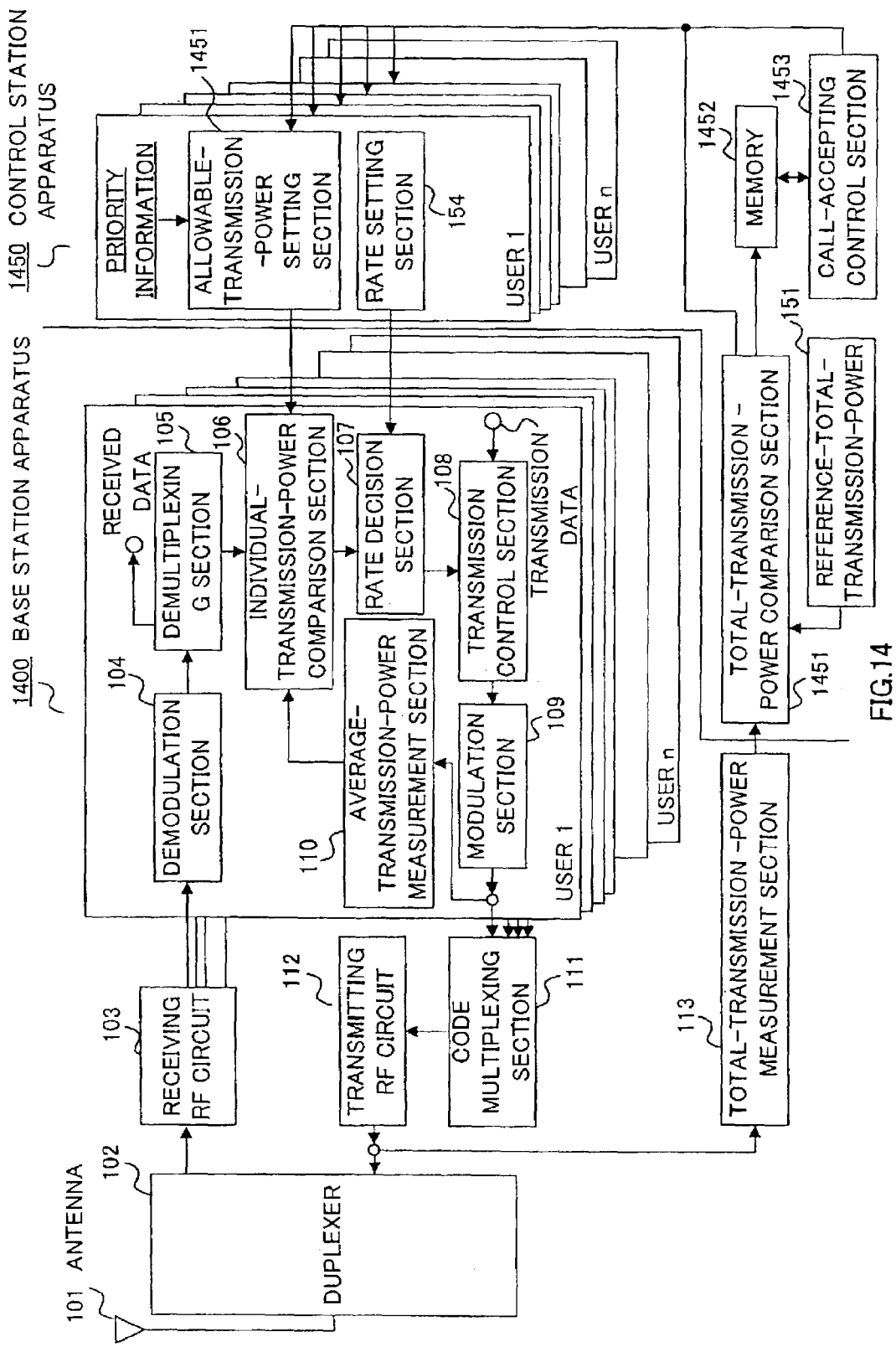
FIG. 14 is a block diagram showing a configuration of a base station apparatus and a control station apparatus according to an embodiment 5 of the present invention.

A base station apparatus and a control station apparatus of the present embodiment predict increase in transmission power at accepting of a call from a new user, and judge whether the increase in the transmission power is within an allowable range or not. FIG. 14 is a block diagram showing a configuration of the base station apparatus and the control station apparatus according to the embodiment 5 of the present invention. However, common components to those in FIG. 1 are denoted by the same reference numbers as those in FIG. 1, and detailed description will be eliminated.

There is a difference between FIG. 14 and FIG. 1 in a point that a control station apparatus 1450 in FIG. 14 comprises a memory 1452 and a call-accepting control section 1453; predicts a transmission-power value which will be increased by accepting a call from a new user; and judges whether the increase in the transmission-power value is within an allowable range for the base station apparatus to accept the call or not.

Then, function blocks for controlling the total-transmission-power will be described. A total-transmission-power measurement section 113 measures a total-transmission-power-value, and outputs the total-transmission-power-value to a total-transmission-power comparison section 1451. A reference-total-transmission-power setting section 151 sets a reference total-transmission-power-value, and outputs the set reference total-transmission-power value to the total-transmission-power comparison section 1451.

The total-transmission-power comparison section 1451 compares the reference total-transmission-power-value input from the reference-total-transmission-power setting section 151, and the total-transmission-power-value input from he total-transmission-power measurement section 113; outputs instructions to change the transmission power to allowable-transmission-power setting sections 1454; and outputs a difference in the total-transmission-power which is a difference between the total-transmission-power-value and the reference total-transmission-power-value to the memory 1452.

The memory 1452 stores the difference in the total-transmission-power which is the difference between the total-transmission-power-value and the reference total-transmission-power-value.

When the call from the new user is accepted, the call-accepting control section 1453 requests the difference in the total-transmission-power at this point to the memory 1452, and acquires the requested difference; adds a power value (Puser), which the new user desires, to the difference in the total-transmission-power; and obtains the difference in the total-transmission-power after the addition of the power. Here, the difference in the total-transmission-power after the addition of the power is almost equal to the difference between the total-transmission-power-value and the reference total-transmission-power-value after accepting the call from the new user.

And, the call-accepting control section 1453 accepts the call when it is judged, based on the difference in the total-transmission-power after the addition of the power, that there is a margin in the transmission-power-value for accepting the new user, considering the reference total-transmission-power-value; and outputs the difference in the total-transmission-power after the addition of the power to the allowable-transmission-power setting sections 1454.

The allowable-transmission-power setting sections 1454 set the allowable transmission-power-values, based on the difference in the total-transmission-power after the increase in the power. For example, when it is judged that there is a small margin in the transmission-power value for accepting the new user, that is, when the difference in the total-transmission-power, which is input from the call-accepting control section 1453, after the addition of the power is very small, the allowable-transmission-power setting sections 1454 set rather small allowable transmission-power-values for the user so that the total-transmission-power-value of the whole base station apparatus does not exceed the reference total-transmission-power-value.

Moreover, when it is judged that there is no margin in the transmission-power for accepting the new user, based on the difference in the total-transmission-power at a point in which the request to accept the call is received, and on power value (Puser) which the new user desires, the call-accepting control section 1453 rejects the call.

The allowable-transmission-power setting sections 1454 set appropriate allowable transmission-power-values, based on the difference, which is received from the call-accepting control section 1453, in the total-transmission-power after the addition of the power. Once the call is accepted, the allowable-transmission-power setting sections 1454 set, in a similar manner to that of the embodiment 1, the allowable transmission-power-values, based on the difference in the total-transmission-power at a point in which the difference is output from the total-transmission-power comparison section 1451.

Figure 15:
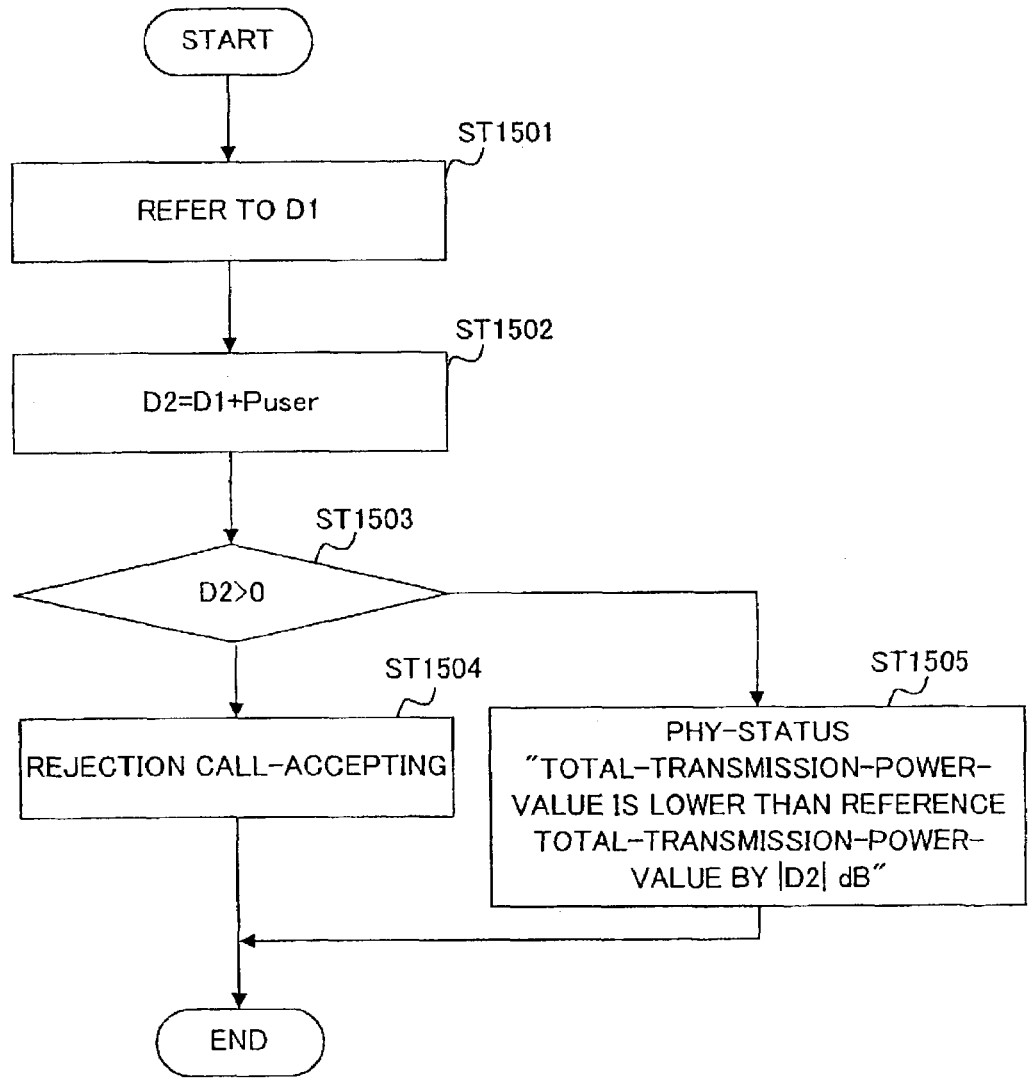
FIG. 15 is a flow chart showing a method for controlling acceptance of call-processing in the base station apparatus and the control station apparatus according to the above embodiment.

Then, a flow for processing in the call-processing control section 1453 will be described, using FIG. 15.

At ST1501, the call-processing control section 1453 refers to the difference D1 between the total-transmission-power-value and the reference total-transmission-power-value stored in the memory 1452 at accepting the new call. At ST1502, the call-processing control section 1453 adds a desired power value (Puser), which would be increased at accepting the new user, to D1, and obtains the difference in the total-transmission-power (D2) after the addition of the power.

At ST1503, it is judged whether D2 is larger than 0 or not. When D2 is larger than 0, that is, when the total-transmission-power-value after the addition of the power is larger than the reference total-transmission-power-value, the call-accepting control section 1453 rejects the call at ST1504. When D2 is equal to or less than 0 at ST1503, a message saying "the total-transmission-power-value is lower than the reference total-transmission-power-value by |D2| dB" is shown at ST1505; the call-processing control section 1453 accepts the new user; and D2 is output to the allowable-transmission-power setting sections 1454.

Thus, according to the base station apparatus and the control station apparatus of the present embodiment, judgement for accepting a new call is performed by predicting increase in transmission power, and by judging whether the total-transmission-power-value after addition of the increase is within an allowable range or not. When the total-transmission-power-value exceeds the reference total-transmission-power-value, the system is in a limit state. In this case, it is possible, not by controlling the total-transmission-power-value through reducing the allowable transmission-power-values of a lot of users after accepting the new call, but by not-accepting the new call, to prevent reduction in the allowable transmission-power-values of users under current communication, that is, the maximum transmission rates at which transmission is possible.

Here, there is a shortage of resources as a system, when the difference between the total-transmission-power-value and the reference total-transmission-power-value is small, though the total-transmission-power-value does not exceed the reference total-transmission-power-value. In this case, more users than those in a usual system can be accepted by setting an allowable transmission-power-value, which is smaller than the difference between the total-transmission-power-value and the reference total-transmission-power-value, as an initial value even in a state in which acceptance of a new call is usually rejected.

In addition, the inventors of the present invention have previously made an invention, in which the transmission-power-values of the base station for communication terminals are appropriately controlled, not depending on the environments and the transmission rates of communication terminals, as more data are transmitted at raised transmission rates in good channel states, and amount of transmission data is suppressed by reducing the transmission rates in poor channel states by switching of transmission rates of transmission signals based on information on received quality from communication terminals, that is, according to the environments of the communication terminals, and by transmission of transmission signals at the switched transmission rates. The above invention has been disclosed in the Japanese Patent Application 2000-025602.

Then, the base station apparatus and the control station apparatus according to the present invention may be configured, in a similar manner to that of the above invention, so that changes in allowable transmission-power-values to be set for each communication terminal are instructed based on comparison between a total-transmission-power-value and a reference total-transmission-power-value; transmission rates of transmission signals are switched based on information on received quality from the communication terminals, that is, corresponding to the environments of the communication terminals; and the transmission signals are transmitted at the switched transmission rates.

And, a method for changing power values of signals to be transmitted to each communication terminal is not specially limited, and any methods for the above object may be applied to the present invention if transmission rates or transmission power may be controlled according to instructions to change transmission power values.

As it is clear from the above description, the total-transmission-power-value of the base station is appropriately controlled, not depending on the environments and the transmission rates of communication terminals in the base station apparatus, the control station apparatus, and the method for controlling transmission power according to the present invention, as the allowable transmission-power-values to be set for each communication terminal are decided according to changes in the total-transmission-power-value of the base station, and the transmission rates are decided by the decided allowable transmission-power-values.

The present description is based upon claims from the prior Japanese Patent Application 2000-259510, filed on Aug. 29, 2000. The entire contents are incorporated herein by reference.

INDUSTRIAL APPLICABILITY

The present invention is preferably used for a base station apparatus and a control station apparatus used in a digital radio communication system.

The invention claimed is:

1. A base station apparatus comprising: total-transmission-power measurement means for measuring a total-transmission-power-value which is a sum of transmission power of signals transmitted to a plurality of communication terminals at the same time; comparison means for outputting instructions to reduce allowable transmission-power to a control station apparatus when said total-transmission-power-value is larger than a reference total-transmission-power-value which has been previously set; and transmission control means for deciding transmission rates of the signals for each communication terminal apparatus, based on allowable transmission-power-values which have been output from said control station apparatus.

2. A control station apparatus comprising: comparison means for judging whether allowable transmission power is required to be reduced or not when a total-transmission-power-value output from a base station apparatus is larger than a reference total-transmission-power-value which has been previously set; and allowable-transmission-power setting means for setting, for each communication terminal, allowable transmission-power-values, which represent allowable power of signals based on said judgment, and for outputting the set values to said base station apparatus, wherein said base station apparatus comprises: total-transmission-power measurement means for measuring the total-transmission-power-value which is a sum of transmission power of said signals transmitted to a plurality of communication terminals at the same time, and for outputting the measured values to said control station apparatus; and transmission control means for deciding transmission rates of the signals for each communication terminal, based on allowable transmission-power-values, which have been output from said control station apparatus, for each communication terminal apparatus.

3. A control station apparatus according to claim 2, wherein in said allowable-transmission-power setting means, said allowable transmission-power-values are assumed to be a value obtained by multiplication of said allowable total-transmission-power-values by a transmission-power ratio obtained by division of said transmission power of each communication terminal apparatus by said total-transmission-power-value, when said total-transmission-power-value exceeds said reference total-transmission-power-value.

4. A control station apparatus according to claim 2, wherein in said allowable-transmission-power setting means, said allowable transmission-power-values are set to be a value obtained by subtraction with a value, which has been previously set, to be changed, when said total-transmission-power-value exceeds said reference total-transmission-power-value.

5. A control station apparatus according to claim 2, wherein said allowable-transmission-power setting means decides said allowable total-transmission-power-values by weighting based on priority information.

6. A control station apparatus according to claim 2, comprising call-processing control means for estimating increase in said total-transmission-power-value by accepting a new call, and for accepting the new call when said increase in said total-transmission-power-value is equal to or smaller than a difference between said reference total-transmission-power-value and said total-transmission-power-value.

7. A control station apparatus according to claim 6, wherein said call-processing control means estimates increase in said total-transmission-power-value by accepting a new call, and sets said allowable transmission-power which is smaller than said difference between said reference total-transmission-power-value and said total-transmission-power-value when said increase in said total-transmission-power-value is equal to or larger than said difference between said reference total-transmission-power-value and said total-transmission-power-value.

8. A control station apparatus comprising allowable-transmission-power setting means for setting allowable transmission values for each communication terminal apparatus based on instructions output from a base station apparatus to reduce allowable transmission-power, and for outputting the set values to said base station apparatus, wherein said base station apparatus comprises: total-transmission-power measurement means for measuring a total-transmission-power-value which is a sum of transmission power of signals transmitted to a plurality of communication terminals at the same time; comparison means for outputting an instruction to reduce allowable transmission power to said control station apparatus, when said total-transmission-power-value is larger than a reference total-transmission-power-value which has been previously set; and transmission control means for deciding transmission rates of the signals for each communication terminal, based on said allowable transmission-power-values output from said control station apparatus.

9. A control station apparatus according to claim 8, wherein in said allowable-transmission-power setting means, said allowable transmission-power-values are assumed to be a value obtained by multiplication of said allowable total-transmission-power-values by transmission-power ratios obtained by division of said transmission power of each communication terminal apparatus by said total-transmission-power-value, when said total-transmission-power-value exceeds said reference total-transmission-power-value.

10. A control station apparatus according to claim 8, wherein in said allowable-transmission-power setting means, said allowable transmission-power-values are set to be a value obtained by subtraction with a value, which has been previously set, to be changed, when said total-transmission-power-value exceeds said reference total-transmission-power-value.

11. A control station apparatus according to claim 8, wherein said allowable-transmission-power setting means decides said allowable total-transmission-power-values by weighting based on priority information.

12. A control station apparatus according to claim 8, comprising call-processing control means for estimating increase in said total-transmission-power-value by accepting a new call, and for accepting the new call when said increase in said total-transmission-power-value is equal to or smaller than a difference between said reference total-transmission-power-value and said total-transmission-power-value.

13. A control station apparatus according to claim 12, wherein said call-processing control means for estimating said increase in said total-transmission-power-value by accepting said new call, and for setting said allowable transmission power which is smaller than said difference between said reference total-transmission-power-value and said total-transmission-power-value when said increase in said total-transmission-power-value is equal to or larger than said difference between said reference total-transmission-power-value and said total-transmission-power-value.

* * * * *